(12) United States Patent
Vu

(10) Patent No.: US 7,225,835 B2
(45) Date of Patent: Jun. 5, 2007

(54) MODULAR SUBSTRATE GAS PANEL HAVING MANIFOLD CONNECTIONS IN A COMMON PLANE

(75) Inventor: Kim Ngoc Vu, Yorba Linda, CA (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 11/232,031

(22) Filed: Sep. 21, 2005

(65) Prior Publication Data

US 2006/0011247 A1    Jan. 19, 2006

Related U.S. Application Data

(62) Division of application No. 10/650,102, filed on Aug. 26, 2003.

(60) Provisional application No. 60/406,132, filed on Aug. 27, 2002.

(51) Int. Cl.
*F16K 11/10* (2006.01)
(52) U.S. Cl. ..................................... 137/884
(58) Field of Classification Search ................. 137/269, 137/270, 271, 597, 884
See application file for complete search history.

(56) References Cited

U.S. PATENT DOCUMENTS

| | | | |
|---|---|---|---|
| 3,534,797 A | 10/1970 | Reinhard | |
| 4,067,531 A | 1/1978 | Sikula | |
| 4,082,324 A | 4/1978 | Obrecht | |
| 4,490,083 A | 12/1984 | Rebish | |
| 4,524,807 A | 6/1985 | Toliusis | |
| 4,681,476 A | 7/1987 | Mischenko | |
| 5,275,074 A | 1/1994 | Taylor et al. | |
| 5,605,179 A | 2/1997 | Strong, Jr. et al. | |
| 5,769,110 A | 6/1998 | Ohmi et al. | |
| 5,836,355 A | 11/1998 | Markulec et al. | |
| 5,979,944 A | 11/1999 | Yokoyama et al. | |

(Continued)

FOREIGN PATENT DOCUMENTS

DE    9411684    9/1994

(Continued)

OTHER PUBLICATIONS

International Search Report from International Patent Application No. PCT/US03/26979, filed Aug. 26, 2003.

(Continued)

*Primary Examiner*—John Fox
(74) *Attorney, Agent, or Firm*—Lowrie, Lando & Anastasi, LLP.

(57) ABSTRACT

A gas panel comprising a first gas stick, a second gas stick, and a first manifold. The first gas stick has a first flow path that includes a first plurality of ports formed in a common plane, and the second gas stick has a second flow path that includes a second plurality of ports formed in the common plane. The first manifold has first and second ports formed in the common plane, the first port being fluidly connected to one port of the first plurality of ports of the first gas stick, and the second port being fluidly connected to one port of the second plurality of ports of the second gas stick. A thermally and vibrationally insulating mounting assembly may be used to mount the first and second gas sticks to a mounting plate.

16 Claims, 18 Drawing Sheets

U.S. PATENT DOCUMENTS

| | | | |
|---|---|---|---|
| 5,983,933 | A | 11/1999 | Ohmi et al. |
| 5,988,217 | A | 11/1999 | Ohmi et al. |
| 5,992,463 | A | 11/1999 | Redemann et al. |
| 6,035,893 | A | 3/2000 | Ohmi et al. |
| 6,039,360 | A | 3/2000 | Ohmi et al. |
| 6,116,282 | A | 9/2000 | Yamaji et al. |
| 6,116,283 | A | 9/2000 | Yamaji et al. |
| 6,125,887 | A | 10/2000 | Pinto |
| 6,135,155 | A | 10/2000 | Ohmi et al. |
| 6,142,539 | A | 11/2000 | Redemann et al. |
| 6,170,890 | B1 | 1/2001 | Ohmi et al. |
| 6,189,570 | B1 | 2/2001 | Redemann et al. |
| 6,192,938 | B1 | 2/2001 | Redemann et al. |
| 6,257,270 | B1 | 7/2001 | Ohmi et al. |
| 6,260,581 | B1 | 7/2001 | Hollingshead |
| 6,273,139 | B1 | 8/2001 | Ohmi et al. |
| 6,293,310 | B1 | 9/2001 | Redemann et al. |
| 6,302,141 | B1 | 10/2001 | Markulec et al. |
| 6,374,859 | B1 | 4/2002 | Vu et al. |
| 6,394,138 | B1 | 5/2002 | Vu et al. |
| 6,408,879 | B1 | 6/2002 | Ohmi et al. |
| 6,422,264 | B2 | 7/2002 | Ohmi et al. |
| 6,435,215 | B1 | 8/2002 | Redemann et al. |
| 6,474,700 | B2 | 11/2002 | Redemann et al. |
| 6,502,601 | B2 | 1/2003 | Eidsmore et al. |
| 6,615,871 | B2 | 9/2003 | Ohmi et al. |
| 6,629,546 | B2 | 10/2003 | Eidsmore et al. |
| 6,634,385 | B2 | 10/2003 | Symington |
| 6,644,353 | B1 | 11/2003 | Eidsmore |
| 6,874,538 | B2 | 4/2005 | Bennett |
| 2002/0000256 | A1 | 1/2002 | Eidsmore et al. |
| 2004/0129324 | A1 | 7/2004 | Vu |
| 2005/0028878 | A1 | 2/2005 | Reid, II et al. |

FOREIGN PATENT DOCUMENTS

| | | |
|---|---|---|
| DE | 19600629 A1 | 7/1997 |
| EP | 0169963 A1 | 2/1986 |
| EP | 0845623 A1 | 6/1998 |
| EP | 1132669 A1 | 9/2001 |
| GB | 2178139 A | 2/1987 |
| JP | 11351500 A | 12/1999 |
| WO | WO 01/16512 A1 | 3/2001 |
| WO | WO 0116512 A1 | 3/2001 |

OTHER PUBLICATIONS

Patent Abstracts of Japan vol. 2000, No. 03, Mar. 30, 2000.

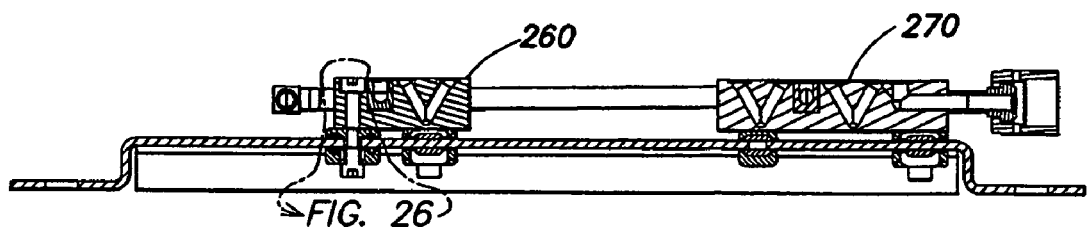
FIG. 25
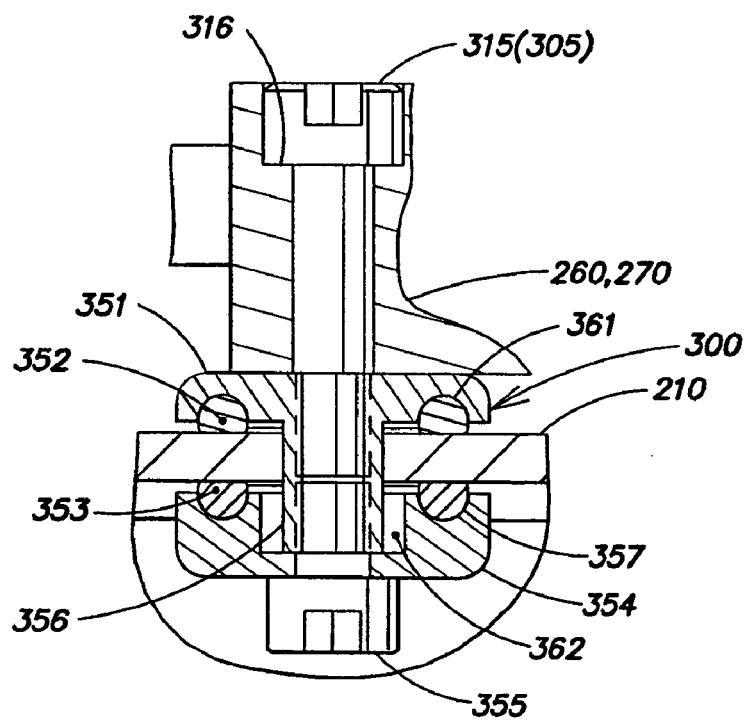
FIG. 26
FIG. 28

MODULAR SUBSTRATE GAS PANEL HAVING MANIFOLD CONNECTIONS IN A COMMON PLANE

CROSS REFERENCE TO RELATED APPLICATIONS

This application is a division, under 35 U.S.C. §120, of commonly-owned, co-pending U.S. patent application Ser. No. 10/650,102, entitled "MODULAR SUBSTRATE GAS PANEL HAVING MANIFOLD CONNECTIONS IN A COMMON PLANE," filed Aug. 26, 2003, which claims priority to U.S. Provisional Application Ser. No. 60/406,132, filed Aug. 27, 2002, entitled MODULAR SUBSTRATE GAS PANEL HAVING MANIFOLD CONNECTIONS IN A COMMON PLANE, each of which is hereby incorporated herein by reference in its entirety.

BACKGROUND OF THE INVENTION

1. Field of the Invention

The present invention is directed fluid distribution systems, and more particularly to a fluid distribution system in which connections between components and fluid flow paths are formed in a common plane.

2. Description of the Related Art

Fluid distribution systems are used in a variety of applications, including the manufacture of semiconductor devices, the manufacture of pharmaceutical compounds, etc. In many of these applications, the size of the fluid distribution system can dramatically affect costs. For example, in the manufacture of semiconductor devices, it is typical for the fluid distribution system or certain portions thereof to be housed in an ultra clean environment, such as a clean room. Further, because many of the fluids used in the manufacture of semiconductors are toxic, highly reactive, or both, such fluid distribution systems frequently require specialized containment and venting equipment. For such systems, any decrease in the size of the fluid distribution system is advantageous.

SUMMARY OF THE INVENTION

According to one embodiment of the present invention, a system for enabling a distribution of fluids is provided. The system comprises a substrate having a substrate body that includes a first substrate port and a second substrate port formed in a first surface and a first fluid passageway that extends in a first direction and fluidly connects the first substrate port to the second substrate port, and a manifold. The manifold has a manifold body that includes a first manifold port formed in a first surface, a second manifold port formed in a second surface that is transverse to the first surface, and a fluid passageway that fluidly connects the first manifold port to the second manifold port. The substrate further includes a channel formed in the first surface of the substrate body that extends in a second direction, the channel being adapted to position the manifold so that the first surface of the substrate body and the first surface of the manifold body are aligned in a common plane.

According to another embodiment of the present invention, a substrate is provided that comprises a substrate body, a first port and a second port formed in a first surface of the substrate body, a first fluid passageway formed in the substrate body and extending in a first direction that fluidly connects the first port to the second port, and a channel. The channel is formed in the first surface of the substrate body and extends in a second direction that is different than the first direction. The channel is adapted to position a manifold having a manifold body that includes a first port formed in a first surface of the manifold body, a second port formed in a second surface of the manifold body, and a fluid passageway that fluidly connects to the first port of the manifold to the second port of the manifold so that the first surface of the substrate body and the first surface of the manifold body are aligned in a common plane.

According to a further embodiment of the present invention as gas panel is provided that comprises a first gas stick, a second gas stick and a first manifold. The first gas stick has a first flow path that includes a first plurality of ports formed in a common plane, and the second gas stick has a second flow path that includes a second plurality of ports formed in the common plane. The first manifold has first and second ports formed in the common plane, the first port being fluidly connected to one port of the first plurality of ports of the first gas stick, and the second port being fluidly connected to one port of the second plurality of ports of the second gas stick.

According to another embodiment of the present invention, a manifold is provided. The manifold is adapted to be received in a substrate having a substrate body that includes first and second substrate ports formed in a first surface of the substrate body, a first substrate fluid passageway extending in a first direction that fluidly connects the first and second substrate ports, and a channel formed in the first surface of the substrate body that extends in a second direction. The manifold comprises a manifold body, at least one first manifold port formed in a first surface of the manifold body, a second manifold port formed in a second surface of the manifold body that is transverse to the first surface of the manifold body, and a manifold fluid passageway formed in the manifold body and extending in the second direction that fluidly connects the at least one first manifold port to the second manifold port. The manifold body is dimensioned to be positioned within the channel so that the first surface of the substrate body and the first surface of the manifold body are aligned in a common plane.

According to another aspect of the present invention, a mounting assembly is provided. According to one embodiment, the mounting assembly comprises first and second members and a first fastener. The first member has a body including a first surface facing a first direction and a second surface facing a second direction opposite to the first direction on opposing surfaces of the body of the first member. The second surface has an outer portion that includes a groove disposed adjacent a perimeter of the outer portion and a central portion that extends from the outer portion in the second direction. The second member has a body including a first surface facing the first direction and a second surface facing the second direction opposite to the first direction on opposing surfaces of the body of the second member. The second surface has a central portion and an outer portion that extends from the central portion and includes a groove disposed adjacent a perimeter of the outer portion. The body of the second member further includes a through hole that extends through the body from the first surface though the central portion of the second surface. The first fastener has a threaded shank that is dimensioned to be received within the through hole in the body of the second member and engage the central portion of the second surface of the body first member.

According to another embodiment, a mounting assembly for mounting a fluid distribution substrate to a plate having a first surface and a second surface parallel to the first surface is provided. The mounting assembly comprises first and second mounting members and first and second fasteners. The first mounting member is disposed adjacent the first surface of the plate and has an internally threaded through hole. The first fastener has an externally threaded shank to engage the internally threaded through hole in the first mounting member and rigidly attach the substrate to the first mounting member. The second mounting member is disposed adjacent the second surface of the plate and also has a through hole. The second fastener has an externally threaded shank to engage the internally threaded through hole in the first mounting member and rigidly attach the second mounting member to the first mounting member. The mounting assembly further comprises means for thermally and vibrationally isolating the substrate from the plate.

According to another aspect of the present invention, a method of attaching a substrate to a mounting plate having a hole that extends through the mounting plate from a first surface of the mounting plate to a second surface of the mounting plate is provided. The method comprises acts of positioning an upper mount subassembly on the first surface adjacent the hole and passing a central portion of the upper subassembly through the hole, positioning a lower mount subassembly on the second surface adjacent the hole so that the central portion of the upper mount subassembly is disposed within a central portion of the lower mount subassembly, fastening the lower mount subassembly to the upper mount subassembly, and fastening the substrate to the upper mount subassembly.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 25 is a cross-sectional side view of a portion of the fluid distribution panel of FIG. 14 taken along line 25-25 in FIG. 15;

FIG. 26 is an expanded view of a floating mount assembly that may be used to mount various components of a fluid distribution panel to a mounting plate according to another aspect of the present invention;

FIG. 28 is a plan view of a hole in a mounting plate that may be used to receive the floating mount assembly of FIG. 26.

DETAILED DESCRIPTION

Figure 1:
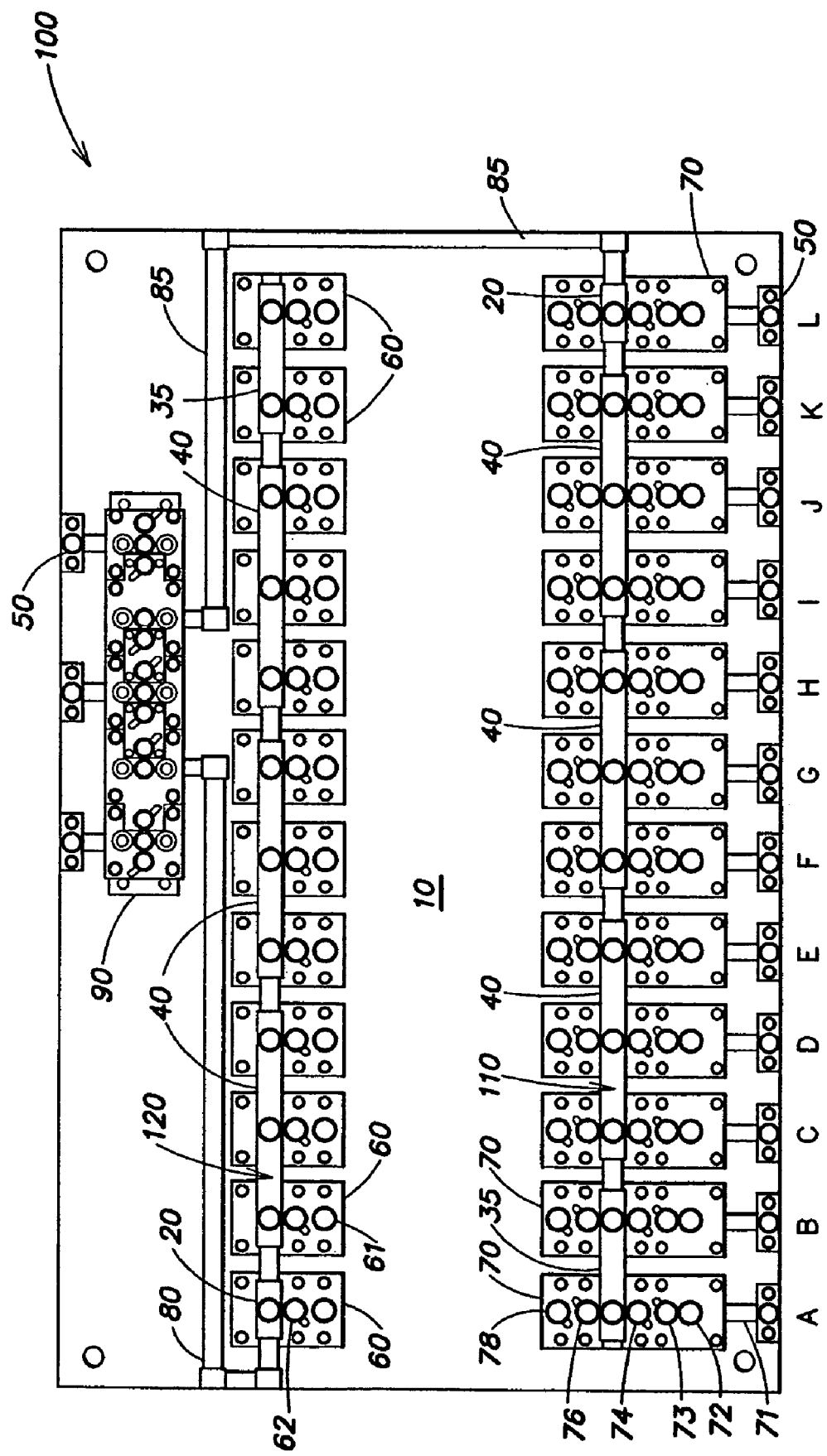
FIG. 1 is a plan view of a fluid distribution panel according to one embodiment of the present invention.
Figure 2:
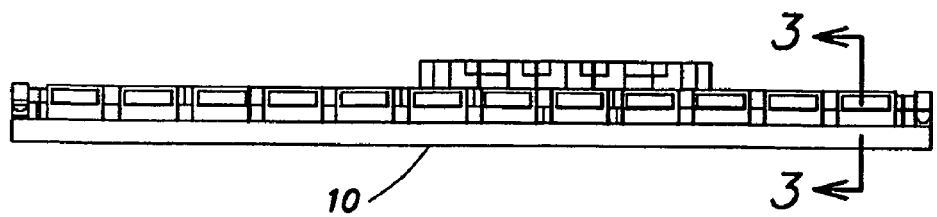
FIG. 2 is a side view of the fluid distribution panel of FIG. 1.
Figure 3:
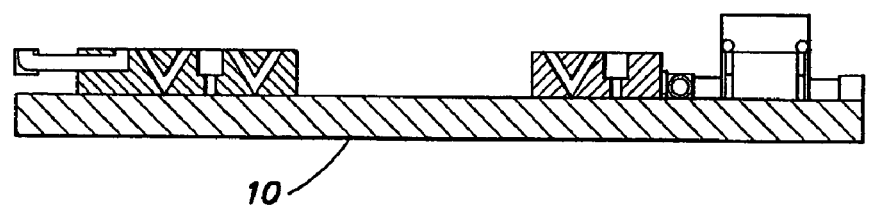
FIG. 3 is a cross-sectional view of a portion of the fluid distribution panel taken along line 3-3 in FIG. 2.
Figure 4:
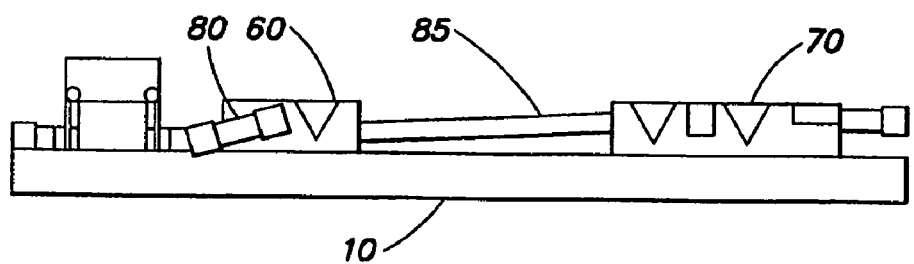
FIG. 4 is a side view of the fluid distribution panel of FIG. 1 rotated by 90° counterclockwise.
Figure 5:
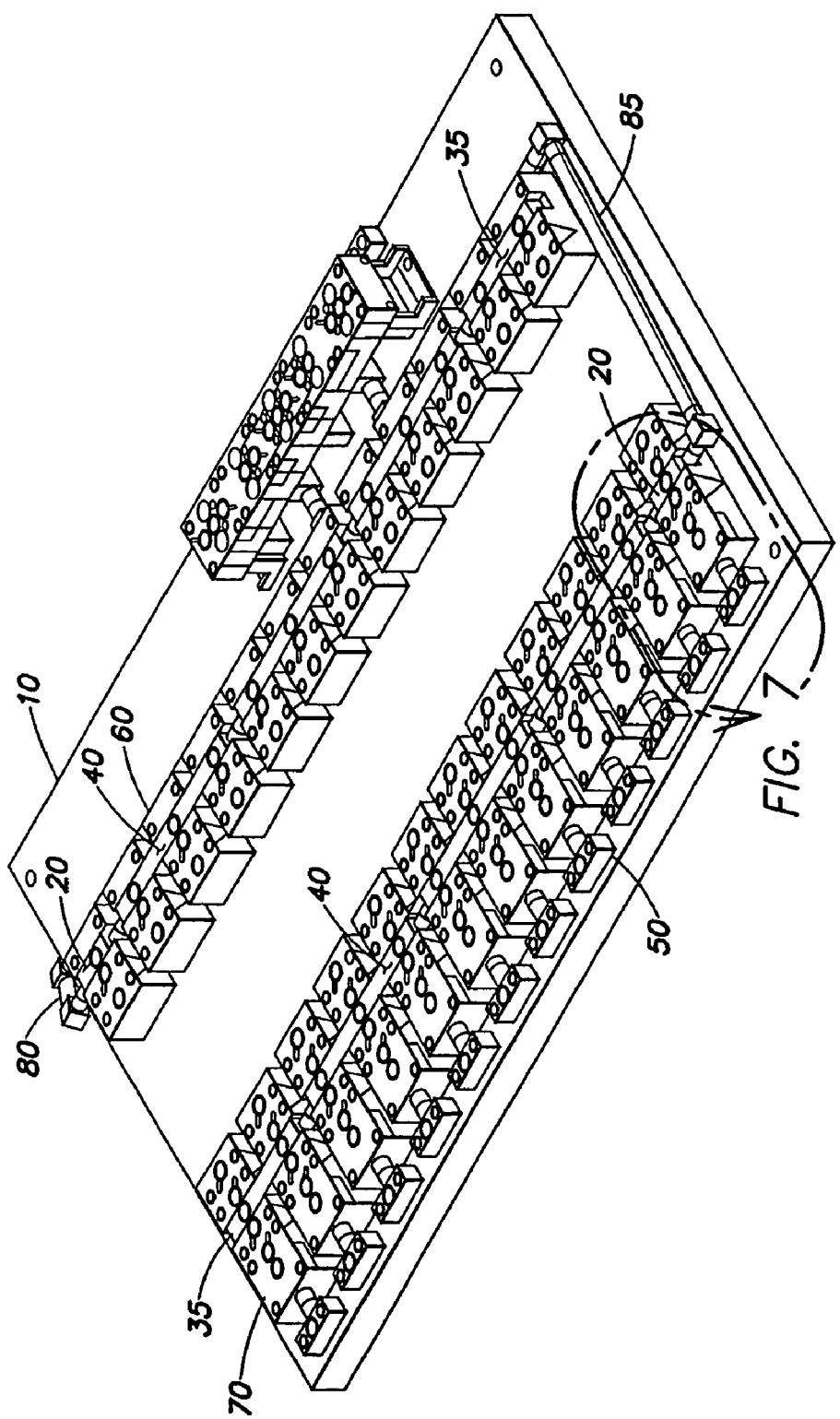
FIG. 5 is a perspective view of the fluid distribution panel of FIG. 1 rotated clockwise by approximately 45°.
Figure 6:
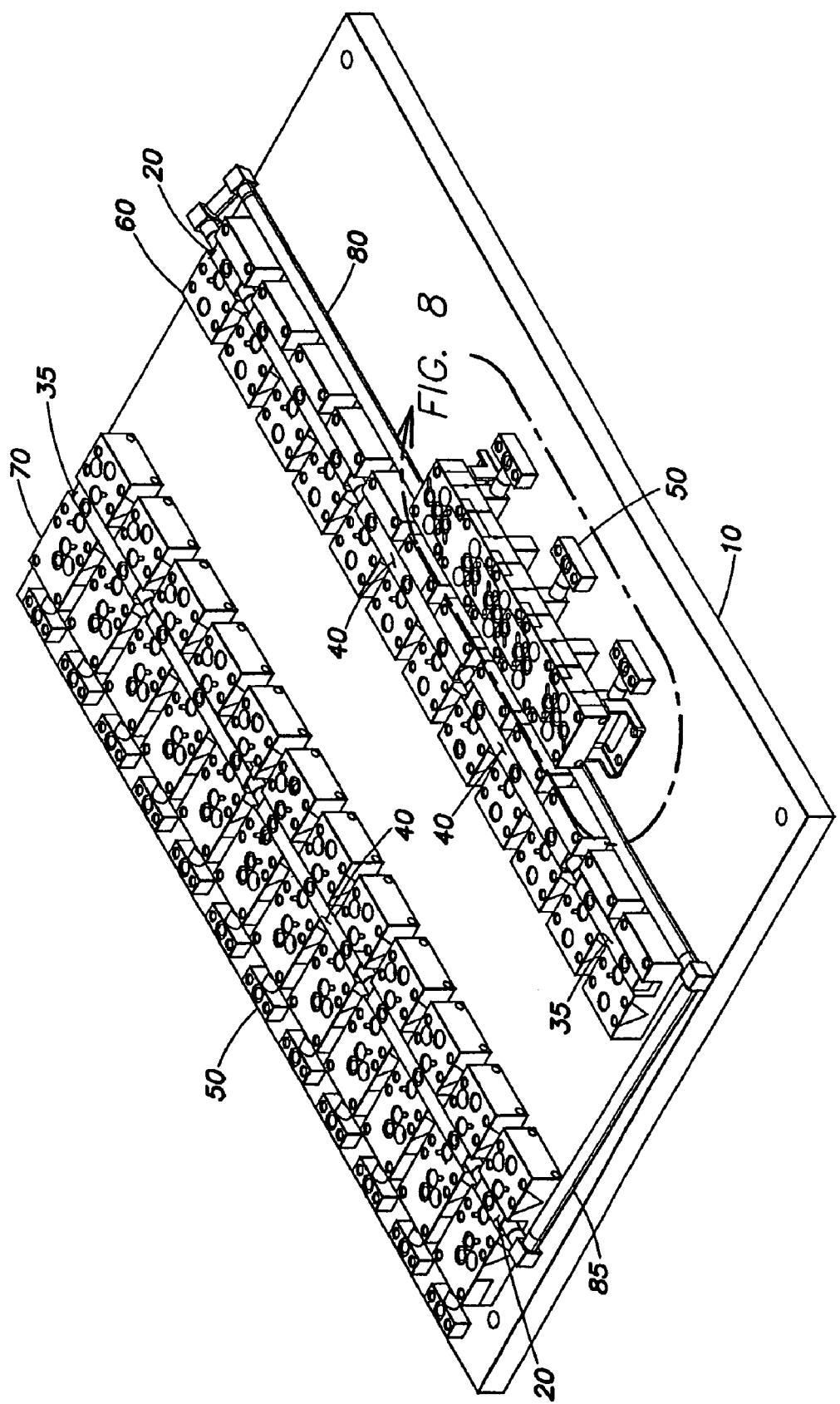
FIG. 6 is a perspective view of the fluid distribution panel of FIG. 1 rotated clockwise by approximately 135°.
Figure 7:
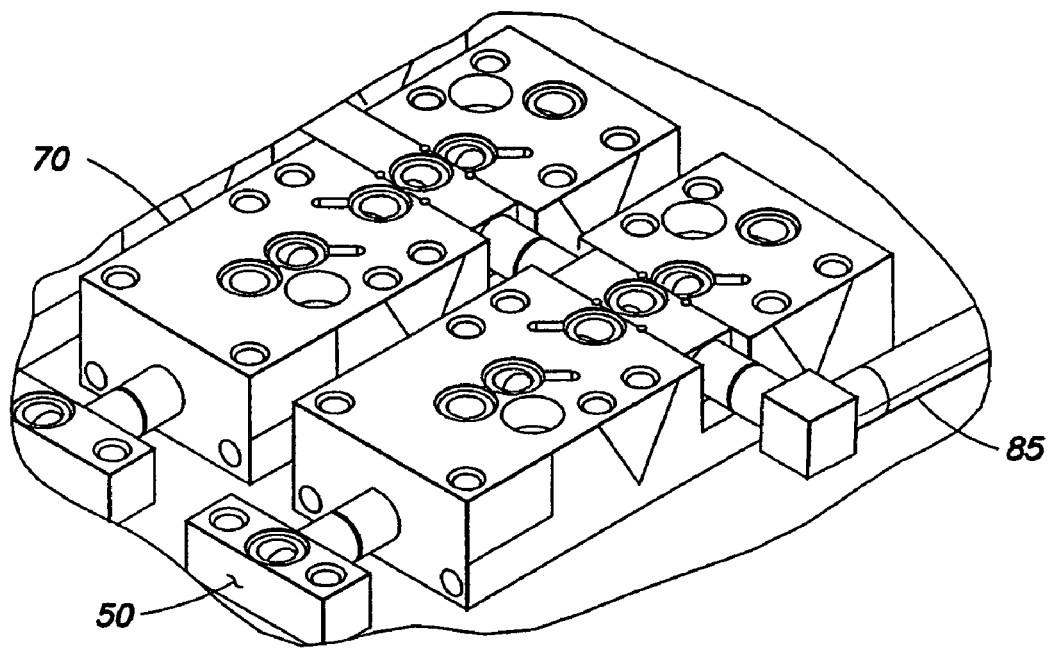
FIG. 7 is an expanded perspective view of a portion of the fluid distribution panel identified in FIG. 5.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 illustrates a plan view of a fluid distribution panel according to one embodiment of the present invention. The fluid distribution panel illustrated in FIG. 1 may be used to selectively provide one or a plurality of different process fluids to a common manifold. For example, the fluid distribution panel may be used to selectively provide one or a plurality of different process fluids to a common manifold, which may itself be fluidly coupled to other portions of a fluid system, or to a fluid processing tool.

Although the present invention is described herein primarily with respect to the distribution of gaseous fluids for semiconductor processing applications, it should be appreciated that the present invention is not so limited, and may also be used with other process fluids, such as liquids or slurries, or with a combination of gasses, liquids, or slurries. Moreover, the present invention is not limited to semiconductor processing applications, as it may also be used in chemical applications, pharmaceutical applications, etc. Accordingly, although the present invention is described hereafter with reference to a system that provides a distribution of process gases for use in semiconductor processing applications, it should be appreciated that the present invention is not so limited.

In broad overview, the fluid distribution panel 100 illustrated in FIG. 1 includes a plurality of gas sticks A-L each adapted to receive a process gas from a process gas supply (not shown) and to provide either the process gas or another gas, such as a purge gas, to another portion of the gas system or to a process tool. Each of the gas sticks A-L provides a flow path that extends in a first direction (from bottom to top in FIG. 1) and includes a plurality of ports that are formed in a common plane. Various fluid processing devices, such as valves, purifiers, filters, pressure transducers, pressure regulators, moisture scrubbers, mass flow controllers, etc. (not shown) are sealingly fastened to adjacent ports in each respective gas stick and pass the process gas or the other gas along the flow path. A first common manifold 110 that includes a plurality of ports is positioned in the flow path of each of the gas sticks to permit either the process gas or another gas, such as a purge gas to be provided by each of the gas sticks to a second common manifold 120. The second common manifold also includes a plurality of ports, and is positioned at the end of the flow path of each of the gas sticks to provide one or more of the process gases or the other gas to a process tool or to a further portion of the gas system. Because the ports in each of the common manifolds are aligned within the common plane of the ports in the flow path, a gas panel having a reduced height may be obtained. This is advantageous as space is at a premium in clean-room environments where such gas panels are frequently used. Further, the number of seals necessary to fluidly couple each of the flow paths to the common manifolds is reduced from that of a gas panel in which the substrates and the manifolds are spaced at different heights. Additionally, where a substrate is used to fluidly couple two ports of one or more substrates to a port of a manifold, the number of fasteners that is necessary to achieve a leak-tight seal can be reduced to four fasteners, as opposed to six or more fasteners in a conventional design. These and other aspects of the present invention are now described in detailed with respect to the accompanying drawings.

As shown in FIG. 1, the gas panel 100 includes a plurality of gas sticks A-L, each of which are mounted to a common base 10. Although no specific mounting configuration is illustrated in the drawings, the gas sticks may be mounted to the common base 10 by any of a number of well known methods from above the base, or from below the base. Each of the gas sticks A-L includes a one component position substrate 60 and a two component position substrate 70 that are fastened to the common base 10, typically with the use of a threaded fastener, such as an Allen bolt. Each of the substrates 60, 70 is typically formed from a block of stainless steel such as 316 stainless steel, hastalloy, or other materials suitable for use with the intended fluids. Each of the substrates 60, 70 has a channel 69, 79 (seen most clearly in FIGS. 9, 10, 11, 12, and 13) that is formed therein to receive a portion of a manifold 20, 25, 30, 35, and 40 (seen most clearly in FIG. 9). Each of the manifold portions 20, 25, 30, 35, and 40 is also typically formed from an elongated block of stainless steel or other suitable material, and connected together to form a common manifold 110, 120. For example, where the manifold portions 20, 25, 30, 35, and 40 are formed from stainless steel, the manifold portions may be butt welded together in a conventional manner to form the common manifolds 110, 120. In the embodiment illustrated in FIG. 1, the two component substrate 70 of each of the gas sticks A-L receives a manifold portion (e.g., manifold portion 35 in gas stick A) that is used to selectively provide a purge gas (provided via conduit 85) to the flow path of the respective gas stick. Each of the one component substrates 60 also receives a manifold portion (e.g., manifold portion 20 in gas stick A) that is used to provide a common outlet that is common to each of the gas sticks A-L and which may be connected to a process tool or to another portion 90 of the gas processing system, as shown in FIG. 1. In the illustrated embodiment, the portion 90 of the gas processing system is formed by a plurality of interconnecting male and female substrates that are described in U.S. Pat. No. 6,394,138 B1, which is herein incorporated by reference in its entirety.

Figure 8:
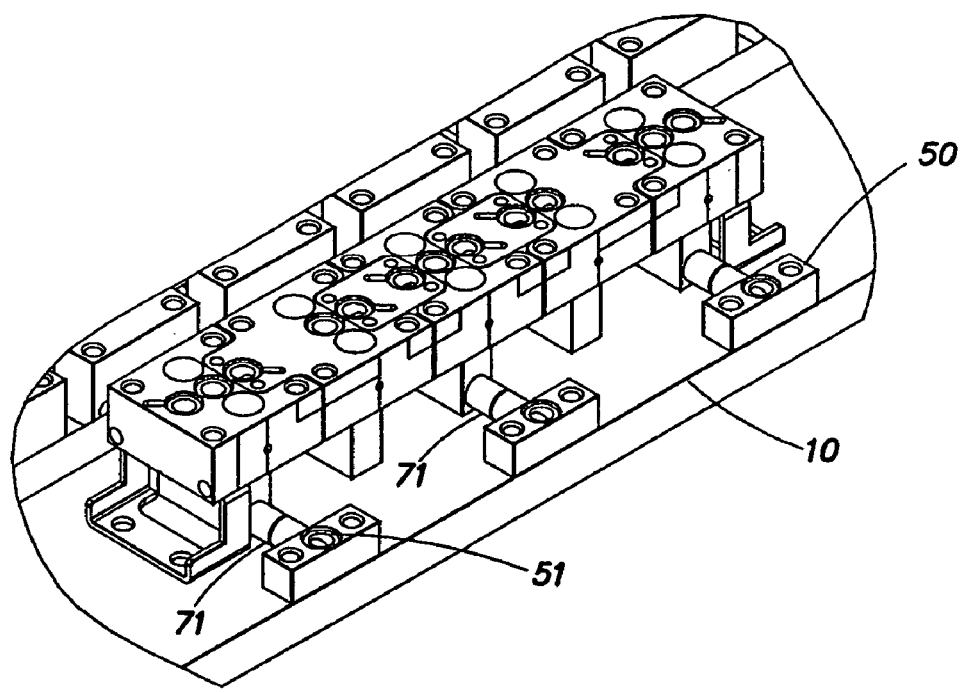
FIG. 8 is an expanded perspective view of a portion of the fluid distribution panel identified in FIG. 6.
Figure 10:
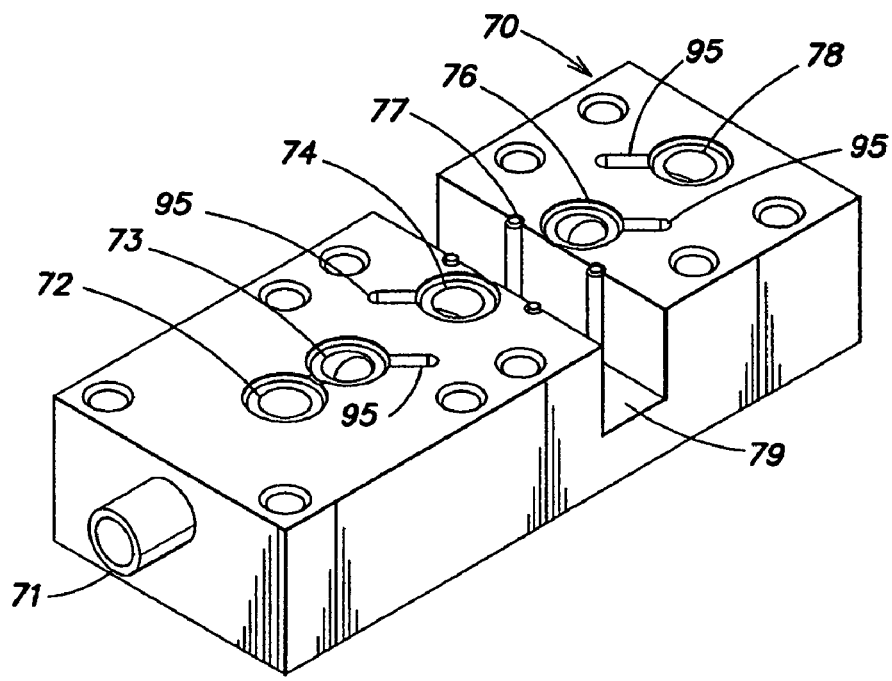
FIG. 10 is an expanded perspective view of a two component position substrate in accordance with one aspect of the present invention.
Figure 11:
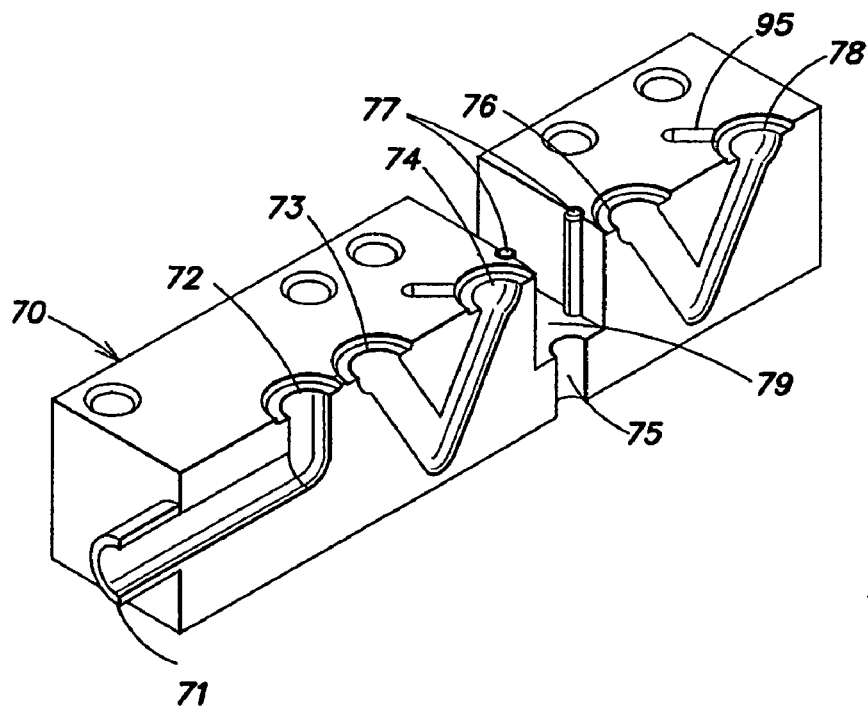
FIG. 11 is a cross-sectional view of the two component position substrate of FIG. 10.

In use, each gas stick A-L is connected to a process gas supply by a flange 50 that is fastened to the base 10 by a pair of fasteners (not shown). A complementary flange (not shown) is typically connected to the flange 50 and to a conduit that provides the process gas from the process gas supply. As seen most clearly in FIG. 8, the flange 50 includes a top port 51 for connection to the process gas supply (via the complementary flange) and a side port 52 that is connected to the top port 51 of the flange 50 and to an inlet port 71 of the substrate 70. The process gas flows through an internal fluid passageway (see FIG. 11, for example) in the substrate 70 to an outlet port 72 formed in the top surface of the substrate 70 (FIGS. 10, 11). A two-port valve or other fluid processing component (not shown) is positioned above the outlet port 72 and an inlet port 73 that is also formed in the top surface of the substrate 70, and forms a seal with the substrate 70. A metallic gasket or other type of sealing member (not shown) is typically used to provide a leak tight seal around the ports 72, 73 as well as the other ports in the top surface of the substrate 70. For example, in the embodiment depicted in FIG. 1, each of the ports formed in the top surface of the substrate (as well as the ports formed in the manifold portions) includes a counter-bore (not numbered, but shown in FIGS. 9, 10, 11, 12, and 13) that is adapted to receive a annular C-shaped seal. Alternatively, other types of annular seals, such as those described in U.S. Pat. No. 5,803,507, and U.S. Pat. No. 6,142,539, which are herein incorporated by reference in their entirety, may be used with appropriately configured ports in the substrate and the manifold portions. In the described embodiment, the two-port valve selectively allows the process gas to flow further along the gas stick.

From inlet port 73, the process gas then flows through a V-shaped channel formed in the body of the substrate 70 (shown in FIG. 11) to an outlet port 74 that is also formed in the top surface of the substrate 70. The substrate 70 includes a channel 79 that is used to receive a portion of the common manifold 110. In the illustrated embodiment of FIG. 1, for example, the substrate 70 of gas stick A receives a two position manifold portion 35 having two ports 37, 39 (FIG. 9) formed in a top surface of the manifold portion 35 and another port 36 formed in a surface of the manifold portion 35 that is transverse to the top surface. The port 36 formed in the transverse surface of the manifold portion 35 is fluidly connected to another manifold portion (e.g., manifold portion 40 in FIGS. 1 and 9), which together form a portion of the common manifold 110. The channel 79 in the substrate 70 is adapted to position the manifold portion 35 so that one of the ports 37, 39 formed in the top surface of the manifold portion 35 is aligned in the common plane of the top surface of the substrate 70 with the outlet port 74 and also with an inlet port 76 on the other side of the channel 79 of the substrate 70. As described in further detail below, the channel and the manifold portions may each include means for aligning the ports 74, 76 that are formed in the top surface of the substrate 70 with one of the ports (e.g., 37, 39) in the top surface of the manifold portion 35.

In the illustrated embodiment, a three-port valve (not illustrated) is positioned above ports 74 and 76 in the substrate 70 and one of the ports 37, 39 in the top surface of the manifold portion 35 and fastened to the substrate 70 by a plurality of fasteners (not shown). The plurality of fasteners are received in bores in the top surface of the substrate 70, that includes at least one bore, and preferably two bores, on each side of the channel 79 in the substrate 70. Advantageously, only four fasteners (two on each side of the channel 79) are needed to form a leak-tight seal with the valve, whereas in conventional designs, traditionally two fasteners are required for each port, for a total of six fasteners required to achieve a leak-tight seal with three ports. The fasteners received on each side of the channel 79, together with a gasket (not shown) or other sealing member form a leak free seal among the ports 74, 76 in the substrate and the port 37 or 39 in the top surface of the manifold portion 35. The three-port valve permits one of either the process gas or another gas, such as a purge gas, that is conducted by the common manifold 110 to be provided by a V-shaped channel connecting the inlet port 76 in the substrate 70 to an outlet port 78 of the substrate 70 (see FIG. 11). In the illustrated embodiment, the inlet port of a mass flow controller (not shown) is fluidly connected to the outlet port 78 in the substrate 70 and provides, by way of an outlet port of the mass flow controller, either the process gas or the other gas to an inlet port 61 of the one component position substrate 60. The mass flow controller bridges the substrate 70 and the substrate 60.

Figure 12:
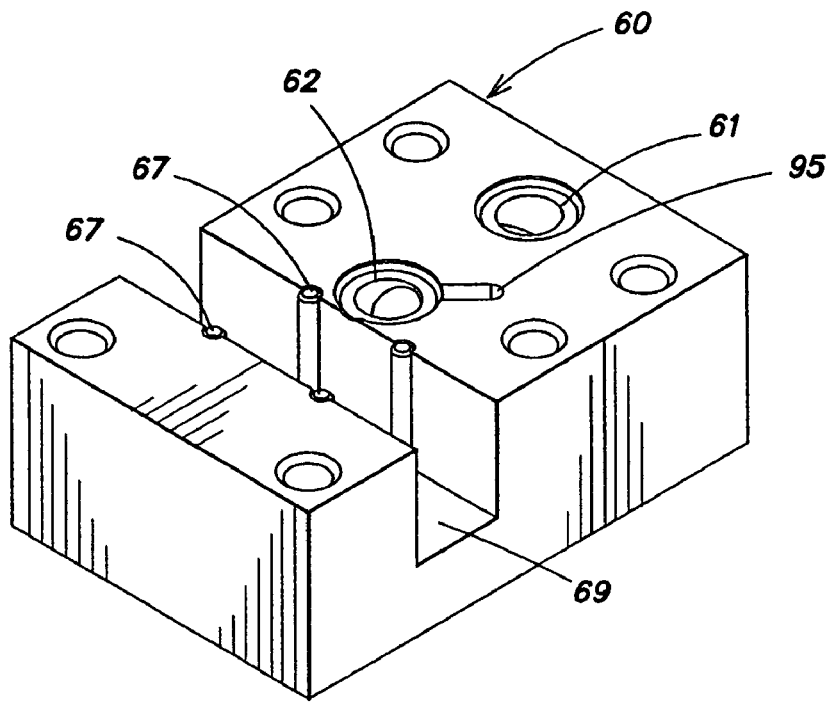
FIG. 12 is an expanded perspective view of a one component position substrate in accordance with another aspect of the present invention.
Figure 13:
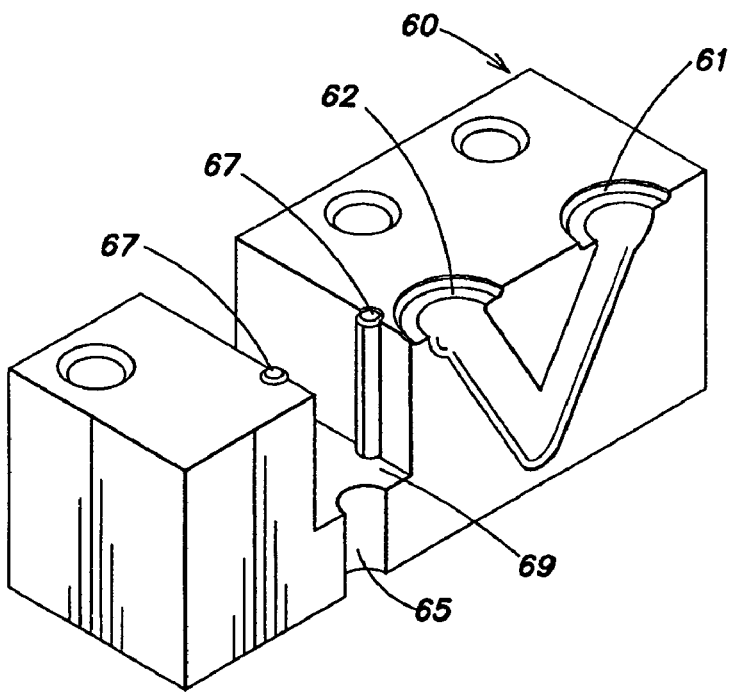
FIG. 13 is a cross-sectional view of the one component substrate shown in FIG. 12.

As best illustrated in FIGS. 12 and 13, the one component position substrate 60 includes an inlet port 61 and an outlet port 62 formed in the top surface of the substrate 60 that are connected by a V-shaped passageway. At least one bore, and preferably two bores, are formed in the top surface of the substrate 60 to sealingly fasten the outlet port of the mass flow controller to the inlet port 61 of the substrate 60.

The substrate 60 also includes a channel 69 that is used to receive a portion of the common manifold 120. In the illustrated embodiment of FIG. 1, for example, the substrate 60 of gas stick A receives a one position manifold portion 20 having a port 22 (FIG. 9) formed in a top surface of the manifold portion 20 and a pair of ports 21, 23 formed in opposing surfaces of the manifold portion 20 that are transverse to the top surface. One of the ports 21, 23 formed in the transverse surfaces of the manifold portion 20 is fluidly connected to another manifold portion (e.g., manifold portion 40 in FIG. 1) that is fluidly connected, by way of other manifold portions, to the outlet ports 62 of the other gas sticks B-L, and the other of the ports 21, 23 is fluidly connected to a conduit 80 that is fluidly connected to either a process tool, or another portion 90 of the gas system.

The channel 69 in the substrate 60 is adapted to position the manifold portion 20 so that the port 22 formed in the top surface is aligned in the common plane of the top surface of the substrate 60 with the outlet port 62 of the substrate 60. As described in further detail below, the channel 69 and the manifold portion 20 may each include means for aligning the outlet port 62 that is formed in the top surface of the substrate 60 with the port 22 formed in the top surface of the manifold portion 20.

In the illustrated embodiment, a two-port valve (not illustrated) is positioned above port 62 in the substrate 60 and the port 22 in the top surface of the manifold portion 20 and fastened to the substrate 60 by a plurality of fasteners (not shown). The plurality of fasteners are received in bores in the top surface of the substrate 60, that includes at least one bore, and preferably two bores, on each side of the channel 69 in the substrate 60. The fasteners received on each side of the channel 69, together with a gasket (not shown) or other sealing member form a leak free seal among the port 62 in the substrate 60 and the port 22 in the top surface of the manifold portion 20. The two-port valve permits one of either the process gas or another gas, such as a purge gas, to be provided to the common manifold 120, and from the common manifold to another portion 90 of the system.

Figure 9:
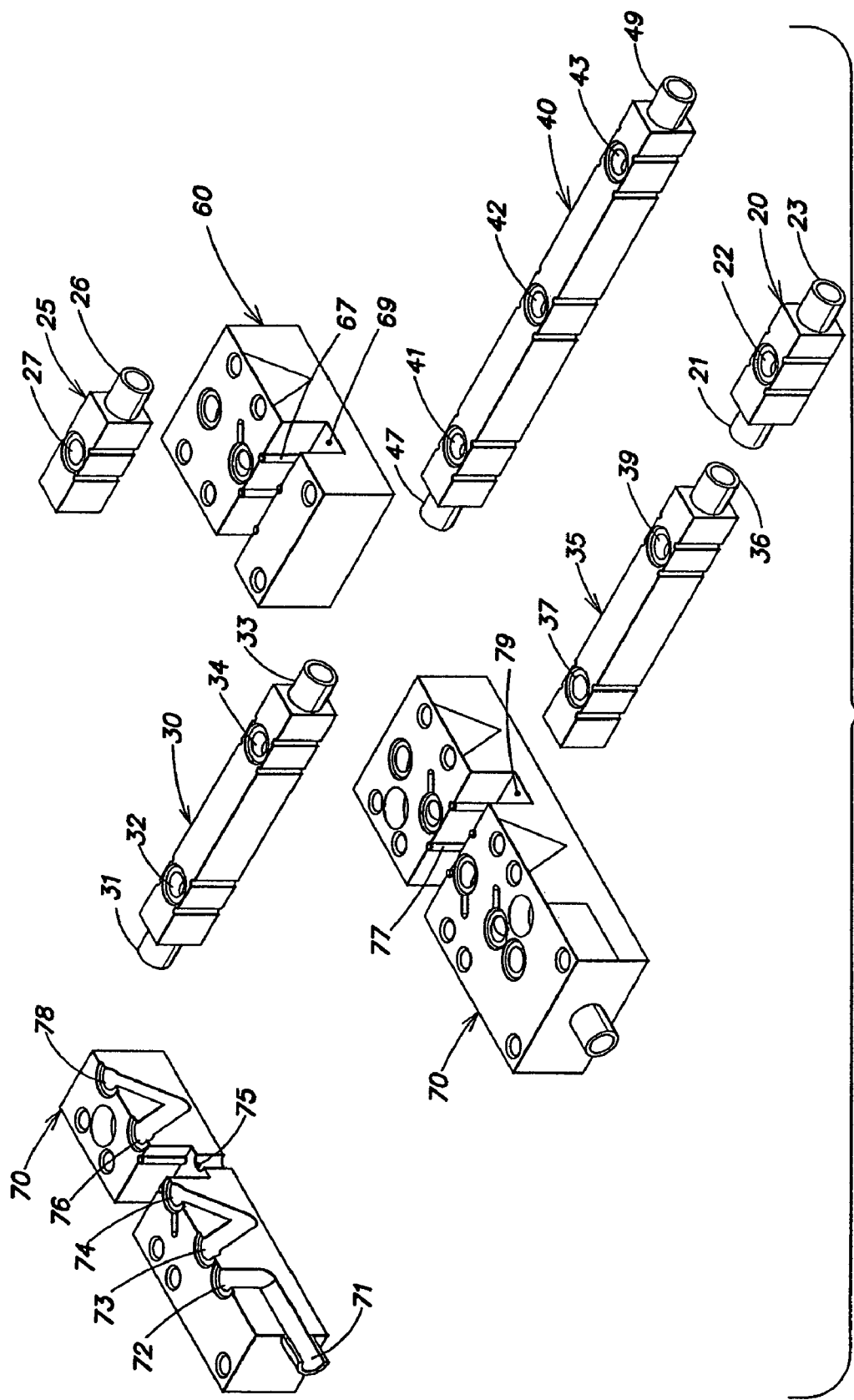
FIG. 9 is a perspective view of a number of different manifolds and substrates that may be used to form the fluid distribution panel of FIG. 1.

FIG. 9 illustrates a number of manifold portions 20, 25, 30, 35, and 40 that may be used to form a gas panel according to an embodiment of the present invention. The manifold portions 20, 25, 30, 35, and 40 are similar in that each includes a manifold body that is formed from an elongated block and each includes at least one port formed in a top surface of the manifold body and at least one port formed in a surface of the manifold body that is transverse to the top surface of the manifold body. Further, each of the manifold portions includes means for aligning the port or ports formed in the top surface of the manifold body with one or more ports formed in the top surface of the substrates 60, 70. In the illustrated embodiment, each of the manifold portions includes a pair of grooves formed in a transverse surface of the manifold body that are spaced apart on the transverse surface on either side of the port and used to align the port on the top surface of the manifold body with the port or ports in the substrate. It should be appreciated that only a single groove can alternatively be used, as well as other alignment means, such as those illustrated in published U.S. application Ser. No. U.S. 2002/0000256A1, which is herein incorporated by reference in its entirety, as known to those skilled in the art.

As shown in FIG. 9, manifold portion 20 includes a single port 22 formed in the top surface of the manifold body and a pair of ports 21, 23 formed in opposing surfaces of the manifold body that are transverse to the top surface of the manifold body. An internal fluid passageway formed along the longitudinal axis of the manifold body connects the top surface port 22 with each of the ports 21, 23 formed in the transverse surfaces.

Manifold portion 25 is similar to manifold portion 20 however, manifold portion 25 includes only a single port 26 formed in the transverse surface of the manifold body. Manifold portion 25 is typically used to terminate the common fluid manifold 110, 120 formed by the interconnection of adjacent manifold portions.

Manifold portion 30 is similar to manifold portion 20 in that it includes a pair of ports 31, 33 formed in opposing transverse surfaces of the manifold body. However, manifold portion 30 includes two ports 32, 34 formed in a top surface of the manifold body. Each of the ports 31, 32, 33, and 34 communicates with an internal fluid passageway formed in the manifold body along the longitudinal axis of the manifold body. Each of the ports 32, 34 formed in the top surface of the manifold are surrounded by a plurality of alignment grooves formed in each side of the manifold body. The manifold portion 30 may be used to fluidly connect a portion of the flow paths of a first gas stick and a second gas stick to another manifold portion, and thus the common manifold 110, 120.

Another manifold portion 35 includes a pair of ports 37, 39 formed in a top surface of the manifold body and a single port 36 formed in a transverse surface of the manifold body. The manifold portion 35 is similar to manifold 25 in that it may be used to terminate the common manifold 110, 120. However, the manifold portion 35 is used to connect a portion of the fluid flow paths of two gas sticks to a common manifold 110, 120, such as, for example, illustrated in FIG. 1.

The manifold portions also include a three-position manifold portion 40 that includes three ports 41, 42, 43 formed in a top surface of the manifold body and a pair of ports 47, 49 formed in opposing surfaces of the manifold body that are transverse to the top surface. Each of the side surfaces of the manifold portion 40 includes a plurality of pairs of grooves formed on each side surface of the manifold body and positioned adjacent to each of the ports 41, 42, and 43 that may be used to align the ports of the manifold portion 40 with the ports of a respective substrate.

It should be appreciated that although a number of different manifold portions 20, 25, 30, 25, and 40 have been described herein, the present invention is not limited to the illustrated embodiments. For example, manifold portions having four or more ports formed on a top surface of the manifold body may be used, with only a single port in a transverse surface of the manifold body, or with two ports formed in opposing transverse surfaces of the manifold body. It should further be appreciated that although the ports formed in the top surface of the manifold portions are illustrated as including a counter-bore that is adapted to receive an annular C-type seal, different port configurations may alternatively be used, such that standard fluid processing components may be used therewith. Moreover, it is not required that all ports formed in the top surface of the manifold have the same type of seal configuration, as one type of seal may be used in one port, while another type of seal may be used in another port.

As shown in FIGS. 9, 10, 11, 12, and 13, alignment grooves may also be formed in a side surface of each of the channels in the substrates 60 and 70 that may be used to align a manifold portion within the channel 69, 79 of the substrate. In use, a manifold portion is inserted into the channel 69, 79 so that the alignment grooves in the channel 60, 70 and in the manifold portion are approximately aligned, and then an alignment pin 67, 77 is inserted into each pair of alignment grooves from above to precisely align the manifold within the channel 69, 79. The alignment pins 67, 77 may be made from any suitable material, but are preferably formed from a material that is inert to the process fluid being used, such that if any leakage should occur the alignment of the manifold portion within the channel is not disturbed.

Each of the alignment pins 67, 77 has a length such that when the alignment pin is inserted into the grooves in the substrate and the manifold portion, the top surface of the alignment pin is no higher than the top surface of the substrate and the manifold portion to avoid interfering with the seal between the ports of the substrate and the manifold and the fluid component fastened thereabove. Although not shown in the drawings, the grooves in the sides of the channel may extend into a base of the channel 69, 79 such that the alignment pins may be longer in length than the depth of the channel, yet still remain below the top surface of the substrate when fully inserted.

As illustrated in FIGS. 11 and 13, each of the substrates 60, 70 may include an aperture 65, 75 formed in the base of the channel that may be used to remove a manifold portion after it has been inserted into the channel. For example, a rigid member, such as a screwdriver may be inserted from below the substrate and used to eject the manifold portion from the channel. Alternatively, the aperture 65, 75 in the base of the channel may be threaded such that a threaded member may be incrementally inserted into the aperture 65, 75 to remove a manifold portion.

As also shown in each of FIGS. 10, 11, and 12, at least one of the ports in the top surface of the substrates 60, 70 may include a leak port 95 that is formed in the top surface of the substrate. Typically, a leak port 95 is provided between each pair of ports to which a fluid component is to be fluidly connected.

In the embodiments described herein, each of the common manifolds 110, 120 are fluidly connected to another portion 90 of the gas processing system. It should be appreciated that the present invention is not limited to this illustrated configuration. For example, the common manifold 110 may instead be fluidly connected by a flange 50 directly to another gas supply. Moreover, although each of the substrates 60, 70 is depicted as having a single channel 69, 79 formed therein, multiple channels may alternatively be provided, such that various fluids may be introduced to each of the gas sticks A-L, or alternatively to one or more of the gas sticks. Moreover, it should be appreciated that although a specific configuration using a two port valve, a three port valve, and a mass flow controller in each of the gas sticks A-L has been described, the present invention is not so limited. Thus, in accordance with the teachings of the present invention, more than two component stations may be provided on a single substrate. For example, the substrate 70 may include one or more additional component stations adapted to receive a filter, a pressure transducer or a pressure regulator, or a variety of other fluid processing components that are conventionally provided. Moreover, it is not required that the fluid components mounted to each of the substrates be the same in each gas stick, as a myriad of different combinations of components may be readily envisioned.

In addition, although the present invention has been described primarily in terms of fluid processing components that utilize a counter-bore type seal, it should be appreciated that other types of fluid processing components, such as face mounted components, cartridge mounted components, etc. may be used, such that the gas panel can accommodate a wide range of commercially available and/or standard components. Further, although no specific configuration for mounting the substrates 60, 70 to the base 10 has been shown, it should be appreciated that any number of mounting methods may be used.

FIGS. 14 through 28 illustrate a fluid distribution panel according to another embodiment of the present invention. As with the embodiment described above with respect to FIGS. 1-13, the embodiment of FIGS. 14 through 28 permits ports formed in a top surface of a substrate to be aligned in a common plane with ports formed in a top surface of a common manifold or portions of a common manifold. For this purpose, many of the substrates include a channel that is formed in a top surface of the substrate in which manifold portions may be received. However, rather than using alignment pins (e.g., alignment pins 67 and 77 in FIGS. 9-13) that fit in grooves formed in the sides of the channel and the manifold portions, the embodiment of FIGS. 14 through 28 uses different means for aligning the ports in the substrates and the manifold portions. For example, as illustrated in FIG. 22, complementary alignment posts 281 and alignment holes 282 may be provided at the base of the channel and the base of the manifold portion to align ports in the top surface of the manifold portion with one or more ports in the top surface of a substrate. The alignment posts may be formed in the base of the channel, with the alignment holes being formed in the base of the manifold portion as shown, or alternatively, the alignment posts may be formed in the base of the manifold portion with the alignment holes being formed in the base of the channel.

Another difference between the embodiments of FIGS. 1-13 and the embodiment of FIGS. 14-28 is that rather than using the mounting of a gas processing component, such as a valve or filter, to fix the alignment of the ports in a common plane, the embodiment of FIGS. 14-28 uses mechanical fasteners to fix the top surfaces of the manifold portions and the substrates within a common plane. As described in further detail below, by rigidly mounting the manifold portions within the channel of a substrate, the fluid path created is rendered substantially more immune to leaks caused by shock or vibration.

A further difference between the embodiments of FIGS. 1-13 and the embodiment of FIGS. 14-28 is that in the embodiment of FIGS. 14-28, each of the component substrates (as well as other components) are resiliently mounted to a mounting plate that may be rigidly attached to a base of the panel. In particular, a floating mount is used to attach various components to a mounting plate, which permits limited movement in three orthogonal directions, provides significant pull and shear strength, thermally decouples components from the mounting plate and base (thereby permitting the components to be effectively heated or cooled without first heating or cooling the thermal mass of the base), and provides vibration damping. These and other aspects of the embodiment of FIGS. 14-28 are now described in detail below.

Figure 14:
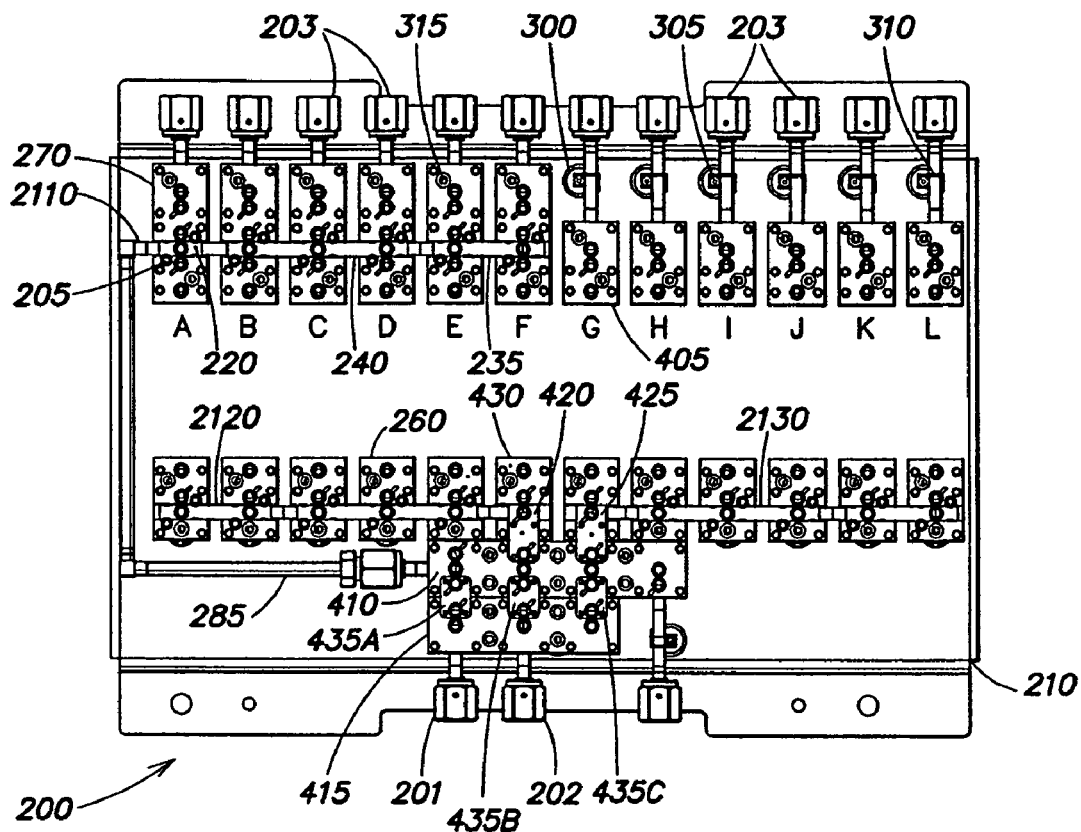
FIG. 14 is a plan view of a fluid distribution panel according to another embodiment of the present invention.
Figure 15:
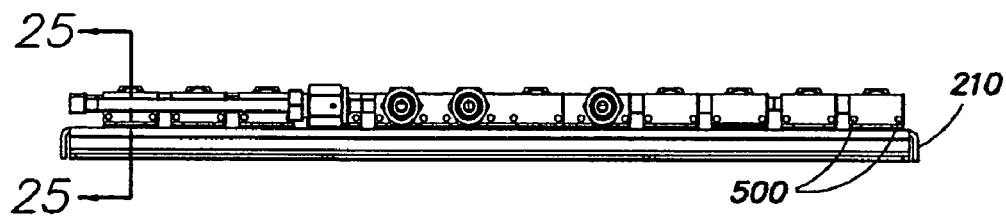
FIG. 15 is a side view of the fluid distribution panel of FIG. 14.
Figure 16:
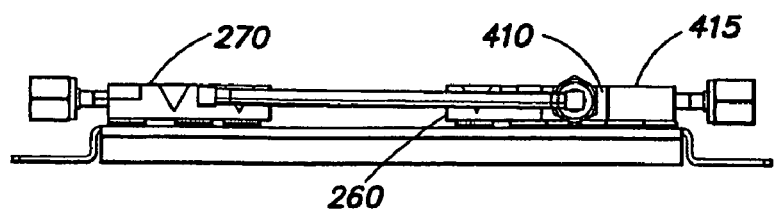
FIG. 16 is a side view of the fluid distribution panel of FIG. 14 rotated by 90° counterclockwise.
Figures 17, 18:
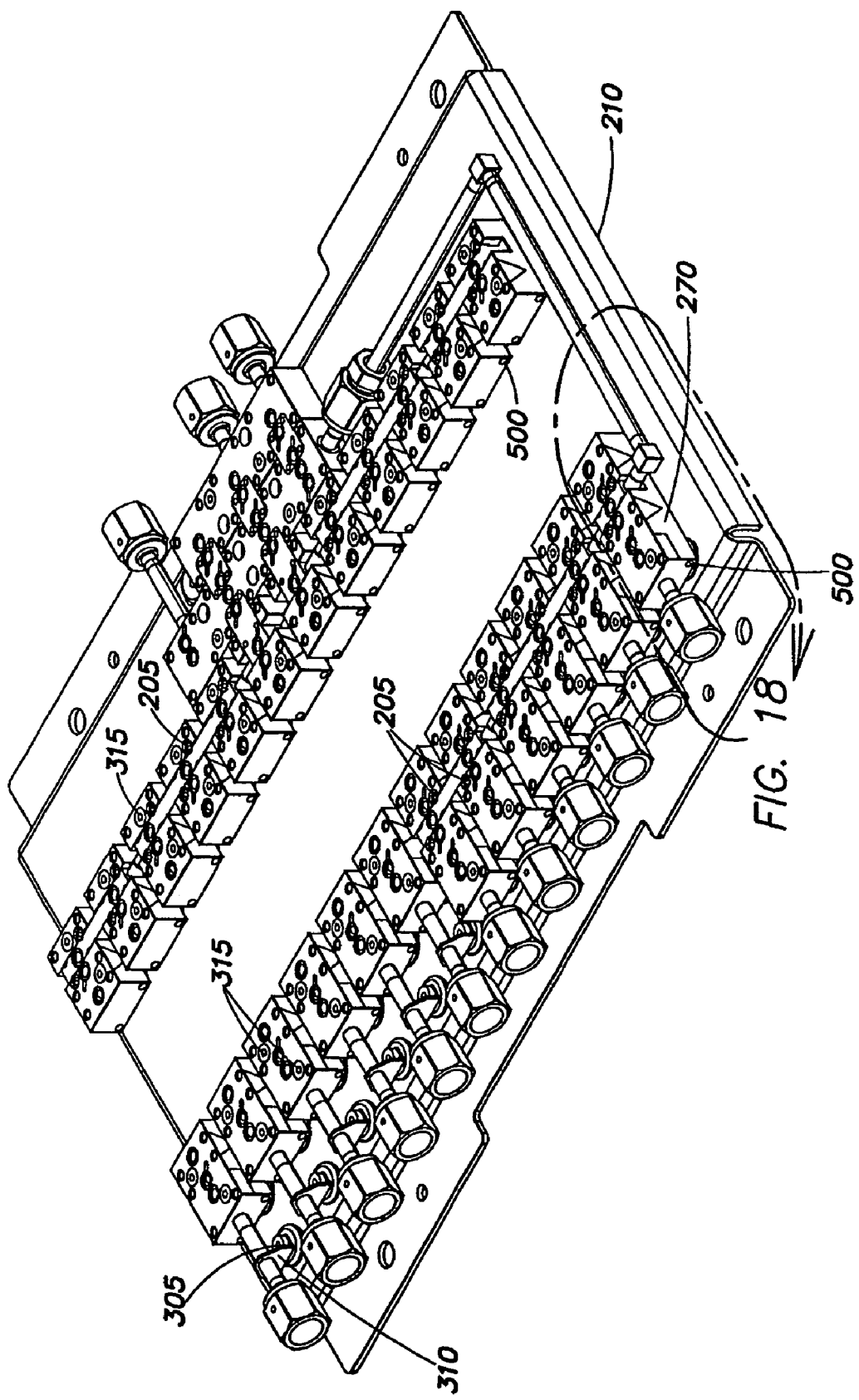
FIG. 17 is a perspective view of the fluid distribution panel of FIG. 14 rotated counter clockwise by approximately 135°.
FIG. 18 is an expanded perspective view of a portion of the fluid distribution panel identified in FIG. 17.
Figure 18:
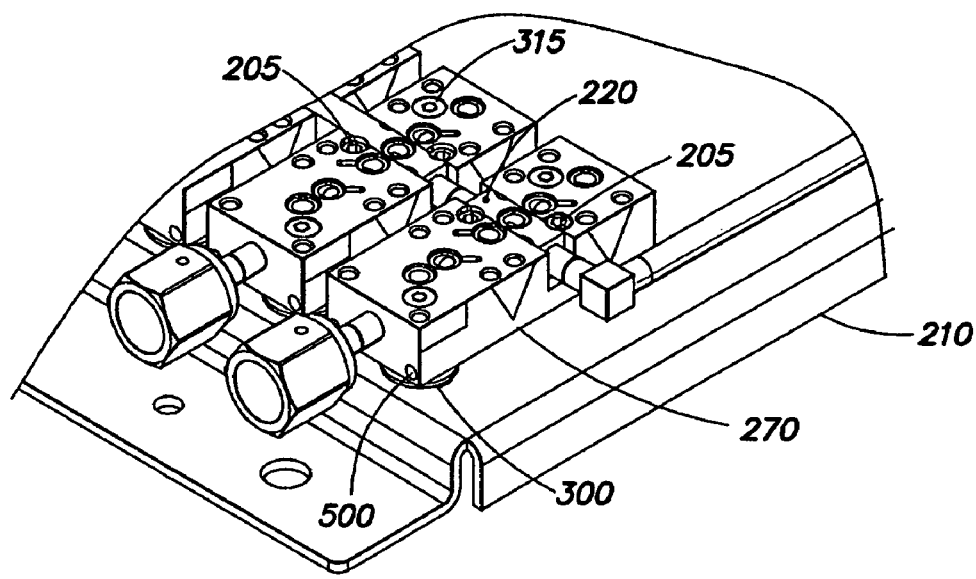

Fluid distribution panel 200 illustrated in FIG. 14 includes a plurality of gas sticks A-L each adapted to receive a process gas from a process gas supply (not shown) and to provide either the process gas and/or another gas, such as a purge gas, to another portion of the gas system or to a process tool. Each of the gas sticks A-L provides a flow path that extends in a first direction (from top to bottom in FIG. 14) and includes a plurality of ports that are formed in a common plane. Various fluid processing devices, such as valves, purifiers, filters, pressure transducers, pressure regulators, moisture scrubbers, mass flow controllers, etc. (not shown) are sealingly fastened to adjacent ports in each respective gas stick and pass the process gas or the other gas along the flow path. A first common manifold 2110 that includes a plurality of ports is positioned in the flow path of a plurality of the gas sticks (i.e., gas sticks A-F) to permit either the process gas or another gas, such as a purge gas to be provided by each of the gas sticks to a second common manifold 2120. The second common manifold 2120 also includes a plurality of ports, and is positioned at the end of the flow path of each of the gas sticks A-E to provide one or more of the process gases or the other gas to a process tool or to a further portion of the gas system (e.g., mixing substrate 410). A third common manifold 2130 that includes a plurality of ports is positioned to receive process gases from one or more of the gas sticks H-L and provide those process gases or combination of process gases to a process tool or further portion of the gas system (e.g., mixing substrate 410). As with the fluid distribution panel described above with respect to FIG. 1, because the ports in each of the common manifolds are aligned within the common plane of the ports in the flow path, a gas panel having a reduced height may be obtained.

As shown in FIG. 14, the gas panel 200 includes a plurality of gas sticks A-L. In contrast to the fluid distribution panel described in FIG. 1, rather than each of the gas sticks being directly and rigidly mounted to a common base (e.g., base 10 in FIG. 1), each of the gas sticks A-L in FIG. 14 is resiliently mounted to a mounting plate 210 using floating mounts (described in further detail below with respect to FIGS. 26 and 27), which, in turn, is mounted to a base (not shown) or other rigid structure. In the described embodiment of FIG. 14, the mounting plate 210 may be formed from a piece of sheet metal that is bent in the manner illustrated in FIGS. 15 and 16. As will be described in more detail further below, the mounting plate 210 has considerably less thermal mass than the base 10 of FIG. 1, such that one or more of the gas sticks A-L may be heated or cooled in an effective manner, by use of a heating or cooling stick inserted in holes 500 (see FIG. 15, for example) that extend through the substrates forming the gas stick. To further thermally isolate the gas sticks, the mounting plate 210 may alternatively be made from a rigid material that is thermally insulating, rather than thermally conductive, such as plastic.

Each of the gas sticks A-E includes a one component position substrate 260 and a two component position substrate 270 that are resiliently fastened to the mounting plate 210, typically with the use of a threaded fastener, such as an Allen bolt. Each of the substrates 260, 270 is typically formed from a block of stainless steel such as 316 stainless steel, hastalloy, or other materials suitable for use with the intended fluids. Each of the substrates 260, 270 has a channel 269, 279 (seen most clearly in FIGS. 22 and 23) that is formed therein to receive a portion of a manifold 220, 225, 230, 235, 240, 255, and 265 (seen most clearly in FIGS. 21 and 22). Each of the manifold portions 220, 225, 230, 235, 240, 255, and 265 is also typically formed from an elongated block of stainless steel or other suitable material, and connected together to form a common manifold 2110, 2120, and 2130. For example, where the manifold portions are formed from stainless steel, the manifold portions may be butt welded together in a conventional manner to form the common manifolds 2110, 2120, and 2130.

In the embodiment illustrated in FIG. 14, the two component position substrate 270 of each of the gas sticks A-F receives a manifold portion (e.g., manifold portion 220 in gas stick A) that is used to selectively provide a purge gas (provided via conduit 285 and substrate insert 435A from purge gas inlet 201) to the flow path of the respective gas stick. Each of the one component position substrates 260 also receives a manifold portion (e.g., manifold portion 235 in gas stick A) that is used to provide a common outlet that is common to each of the gas sticks A-E and may be connected to a process tool or to another portion of the gas processing system, as shown in FIG. 14. In the illustrated embodiment, process gas or gases or purge gases are provided to a mixing inlet substrate 410 via a left-handed substrate insert 420 that is fluidly connected to the common manifold 2120, and then via another insert 435B to a mixing outlet substrate 415, and then to a gas outlet 202.

Other process gases may be received via inlets 203 in gas sticks G-L and provided, via one component position substrates 405 (which do not include a channel), to other one component position substrates 260 that are fluidly connected to common manifold 2130. The one component position substrate 405 illustrated in gas sticks G-L would typically be used to receive an inert, non-toxic, and/or non-reactive process gas that does not require access to a purge gas. As shown, process gases from one or more of gas sticks G-L are provided, via a right handed substrate insert 425 to the mixing inlet substrate 410, and then via another insert 435C to mixing outlet substrate 415, and then to the gas outlet 202.

In use, each gas stick A-L is connected to a process gas supply by a gas inlet 203 that, in the illustrated embodiment, has a threaded coupling. For gas sticks A-F, the process gas flows to an inlet port 271 (see FIG. 23, for example) and through an internal fluid passageway in the substrate 270 to an outlet port 272 formed in the top surface of the substrate 270. A two-port valve or other fluid processing component (not shown) is positioned above the outlet port 272 and an inlet port 273 that is also formed in the top surface of the substrate 270, and forms a seal with the substrate 270. A metallic gasket or other type of sealing member (not shown) is typically used to provide a leak tight seal around the ports 272, 273 as well as the other ports in the top surface of the substrate 270. As in the embodiment depicted in FIG. 1, each of the ports formed in the top surface of the substrate 270 (as well as the ports formed in the manifold portions) may include a counter-bore that is adapted to receive an annular C-shaped seal. Alternatively, other types of annular seals, such as those described in U.S. Pat. No. 5,803,507, and U.S. Pat. No. 6,142,539 may be used with appropriately configured ports in the substrate and the manifold portions. In the described embodiment, the two-port valve selectively allows the process gas to flow further along the gas sticks A-F.

From inlet port 273, the process gas then flows through a V-shaped channel formed in the body of the substrate 270 (shown in FIG. 23) to an outlet port 274 that is also formed in the top surface of the substrate 270. The substrate 270 includes a channel 279 that is used to receive a portion of the common manifold 2110. In the illustrated embodiment of FIG. 14, for example, the substrate 270 of gas stick A receives a one position manifold portion 220 having a single port 222 (FIG. 21) formed in a top surface of the manifold portion 220 and a pair of ports 221, 223 formed in opposing surfaces of the manifold portion 220 that are transverse to the top surface. The ports 221, 223 formed in the transverse surfaces of the manifold portion 220 are fluidly connected to conduit 285 and another manifold portion (e.g., manifold portion 240 in FIGS. 14 and 23), which together form a portion of the common manifold 2110. The channel 279 in the substrate 270 is adapted to position the manifold portion 220 so that the port 222 formed in the top surface is aligned in the common plane of the top surface of the substrate 270 with the outlet port 274 and also with an inlet port 276 on the other side of the channel 279 of the substrate 270.

In contrast to the two component position substrate 70 in which the mounting of a gas processing component or device, such as valve, or filter is used to fix the alignment of ports in a common plane, the two component position substrate 270 uses a pair of fasteners 205 disposed on either side of the channel 279 to rigidly mount the manifold portion within the channel 279 of the substrate. Each fastener 205 is received in a mounting recess 290 formed in a sidewall of the channel as illustrated in FIG. 23. The mounting recess 290 is generally outwardly arcuate in shape, terminates in an internally threaded hole 291, and includes a shelf or edge 292. The edge 292 of the mounting recess 290 serves as a stop for the bottom edge of the head of the fastener 205 (similar in construction to fastener 315 shown in FIG. 26). Each manifold portion 220, 225, 230, 240, 255, and 265 includes a complementary recess 295 (see FIGS. 21 and 22), such that when the fastener 205 is inserted, the bottom edge of the head of the fastener 205 forces the manifold tight against the bottom of the channel 279 of the substrate 270. In general, each of the mounting recesses 290 spans more than 180 degrees, and the complementary recess 295 in the manifold portions spans less than 180 degrees. When aligned, the recesses 290, 295 form a substantially complete circle. The top-most portion of the fastener 205 and the depth of the edge 292 are dimensioned so that the top-most portion of the fastener 205 does not protrude above the top surface of the substrate 270 and interfere with the seal. In general, a pair of fasteners 205 located on opposite side surfaces of the channel 279 is sufficient to force the manifold portion tightly within the channel 279 of the substrate 270.

In the illustrated embodiment, a three-port valve (not illustrated) is typically positioned above ports 274 and 276 in the substrate 270 and the port 222 in the top surface of the manifold portion 220 and fastened to the substrate 270 by a plurality of fasteners (not shown). The plurality of fasteners are received in bores in the top surface of the substrate 270, that includes at least one bore, and preferably two bores, on each side of the channel 279 in the substrate 270. The fasteners received on each side of the channel 279, together with a gasket (not shown) or other sealing member, form a leak free seal among the ports 274, 276 in the substrate and the port 222 in the top surface of the manifold portion 220. The three-port valve permits one of either the process gas or another gas, such as a purge gas, that is conducted by the common manifold 2110 to be provided by a V-shaped channel connecting the inlet port 276 in the substrate 270 to an outlet port 278 of the substrate 270 (see FIG. 23). In the illustrated embodiment, the inlet port of a mass flow controller (not shown) is typically fluidly connected to the outlet port 278 in the substrate 270 and provides, by way of an outlet port of the mass flow controller, either the process gas or the other gas to an inlet port 261 of the one component position substrate 260 (FIG. 23). The mass flow controller bridges the substrate 270 and the substrate 260 in each of gas sticks A-E.

For gas sticks G-L, the process gas received at gas inlet 203 flows to an inlet port 406 (see FIG. 23) of a one component position substrate 405 and through an internal fluid passageway in the substrate 405 to an outlet port 407 formed in the top surface of the substrate 405. A two-port valve or other fluid processing component (not shown) is typically positioned above the outlet port 405 and an inlet port 408 that is also formed in the top surface of the substrate 405, and forms a seal with the substrate 405. A metallic gasket or other type of sealing member (not shown) may be used to provide a leak tight seal around the ports 407, 408 as well as the other ports in the top surface of the substrate 405. Each of the ports 407, 408, and 409 formed in the top surface of the substrate 405 may include a counter-bore that is adapted to receive a annular C-shaped seal, although other types of annular seals may alternatively be used. The two-port valve selectively allows the process gas to flow further along the gas sticks G-L. The one component position substrate 405 does not include a channel (e.g., channel 269), and as noted previously, may be used to receive process gases that do not require purging.

From inlet port 408 in substrate 405, the process gas then flows through a V-shaped channel formed in the body of the substrate 405 (FIG. 23) to an outlet port 409 that is also formed in the top surface of the substrate 405. For each of gas sticks H-L, the inlet port of a mass flow controller (not shown) is typically fluidly connected to the outlet port 409 in the substrate 405 and provides, by way of an outlet port of the mass flow controller, the process gas to an inlet port 261 of the one component position substrate 260 (FIG. 23). The mass flow controller bridges the substrate 405 and the substrate 260 in each of gas sticks G-L.

As best illustrated in FIGS. 22 and 23, the one component position substrate 260 includes an inlet port 261 and an outlet port 262 formed in the top surface of the substrate 260 that are connected by an internal V-shaped passageway. At least one bore, and preferably two bores, are formed in the top surface of the substrate 260 to sealingly fasten the outlet port of the mass flow controller to the inlet port 261 of the substrate 260.

The substrate 260 includes a channel 269 that is used to receive a portion of the common manifolds 2120 and 2130. In the illustrated embodiment of FIG. 14, for example, the substrate 260 of gas stick A receives a two position manifold portion 235 having a pair of ports 237, 239 (FIG. 21) formed in a top surface of the manifold portion 235 and a port 236 formed in a surface of the manifold portion 235 that is transverse to the top surface. The port 236 formed in the transverse surface of the manifold portion 235 is fluidly connected to another manifold portion (e.g., manifold portion 240 in FIG. 14) that is fluidly connected, by way of other manifold portions, to the outlet ports 262 of the other gas sticks C-E. The channel 269 in the substrate 260 is adapted to position the manifold portion 235 so that one of the ports 237, 239 (i.e., port 237) formed in the top surface is aligned in the common plane of the top surface of the substrate 260 with the outlet port 262 of the substrate 260.

In contrast the one component position substrate 60 in which the mounting of a gas processing component or device, such as valve, or filter is used to fix the alignment of ports in a common plane, the one component position substrate 260 uses a pair of fasteners 205 disposed on either side of the channel 269 to rigidly mount the manifold portion within the channel 269 of the substrate 260. In this regard, the one component position substrate 260 is similar to the two component position substrate 270, as each fastener 205 is received in a mounting recess 290 formed in a sidewall of the channel 269 as illustrated in FIG. 23. The mounting recess 290 terminates in an internally threaded hole 291, and includes a shelf or edge 292 that serves as a stop for the bottom edge of the head of the fastener 205. Each manifold portion 220, 225, 230, 240, 255, and 265 includes a complementary recess 295 (see FIGS. 21 and 22), such that when the fastener 205 is inserted, the bottom edge of the head of the fastener 205 forces the manifold portion tight against the bottom of the channel 269 of the substrate 260. The top-most portion of the fastener 205 and the depth of the edge 292 are dimensioned so that the top-most portion of the fastener 205 does not protrude above the top surface of the substrate 260 and interfere with the seal. As with the two component position substrate 270, a pair of fasteners 205 located on opposite side surfaces of the channel 269 is sufficient to force the manifold portion tightly within the channel 269 of the substrate 260.

In the illustrated embodiment, a two-port valve (not illustrated) is positioned above port 262 in the substrate 260 and the port (e.g., port 239) in the top surface of the manifold portion (e.g. manifold portion 235) and fastened to the substrate 260 by a plurality of fasteners (not shown). The plurality of fasteners are received in bores in the top surface of the substrate 260, that includes at least one bore, and preferably two bores, on each side of the channel 269 in the substrate 260. The fasteners received on each side of the channel 269, together with a gasket (not shown) or other sealing member form a leak free seal among the port 262 in the substrate 260 and the port in the top surface of the manifold portion. The two-port valve permits one of either the process gas or another gas, such as a purge gas, to be provided to the common manifold 2120, and from the common manifold to another portion of the system.

Gas sticks F and G share certain components in common with gas sticks A-E and H-L, but illustrate how other components may be used to create a fluid distribution system that can accommodate a wide variety of configurations. For example, gas stick F includes a two component position substrate 270, a one component position T-slotted substrate 430, and a left-handed substrate insert 420. The two component position substrate 270 receives a process gas at a gas inlet 271 from a process gas supply and provides that process gas, via an internal fluid passageway, to an outlet port 272 formed in the top surface of the substrate 270. A two-port valve or other fluid processing component (not shown) is positioned above the outlet port 272 and an inlet port 273 that is also formed in the top surface of the substrate 270, and forms a seal with the substrate 270. From inlet port 273, the process gas then flows through a V-shaped channel formed in the body of the substrate 270 (shown in FIG. 23) to an outlet port 274 that is also formed in the top surface of the substrate 270. The substrate 270 includes a channel 279 that is used to receive a portion of the manifold 2110. In the illustrated embodiment of FIG. 14, for example, the substrate 270 of gas stick F receives a two position manifold portion 235 having a pair of ports 237, 239 (FIG. 21) formed in a top surface and a single port 236 formed in a surface of the manifold portion 235 that is transverse to the top surface. The channel 279 in the substrate 270 is adapted to position the manifold portion 235 so that the port 237 formed in the top surface is aligned in the common plane of the top surface of the substrate 270 with the outlet port 274 and also with an inlet port 276 on the other side of the channel 279 of the substrate 270.

A three-port valve (not illustrated) is typically positioned above ports 274 and 276 in the substrate 270 and the port 237 in the top surface of the manifold portion 235 and fastened to the substrate 270 by a plurality of fasteners (not shown). The fasteners received on each side of the channel 279, together with a gasket (not shown) or other sealing member form a leak free seal among the ports 274, 276 in the substrate and the port 237 in the top surface of the manifold portion 235. The three-port valve permits one of either the process gas or another gas, such as a purge gas, that is conducted by the common manifold 2110 to be provided by a V-shaped channel connecting the inlet port 276 in the substrate 270 to an outlet port 278 of the substrate 270 (see FIG. 23). The inlet port of a mass flow controller (not shown) is fluidly connected to the outlet port 278 in the substrate 270 and provides, by way of an outlet port of the mass flow controller, either the process gas or the other gas to an inlet port 431 of a one component position T-slotted substrate 430 (FIG. 23). The mass flow controller bridges the substrate 270 and the T-slotted substrate 430 in gas stick F.

Figure 24:
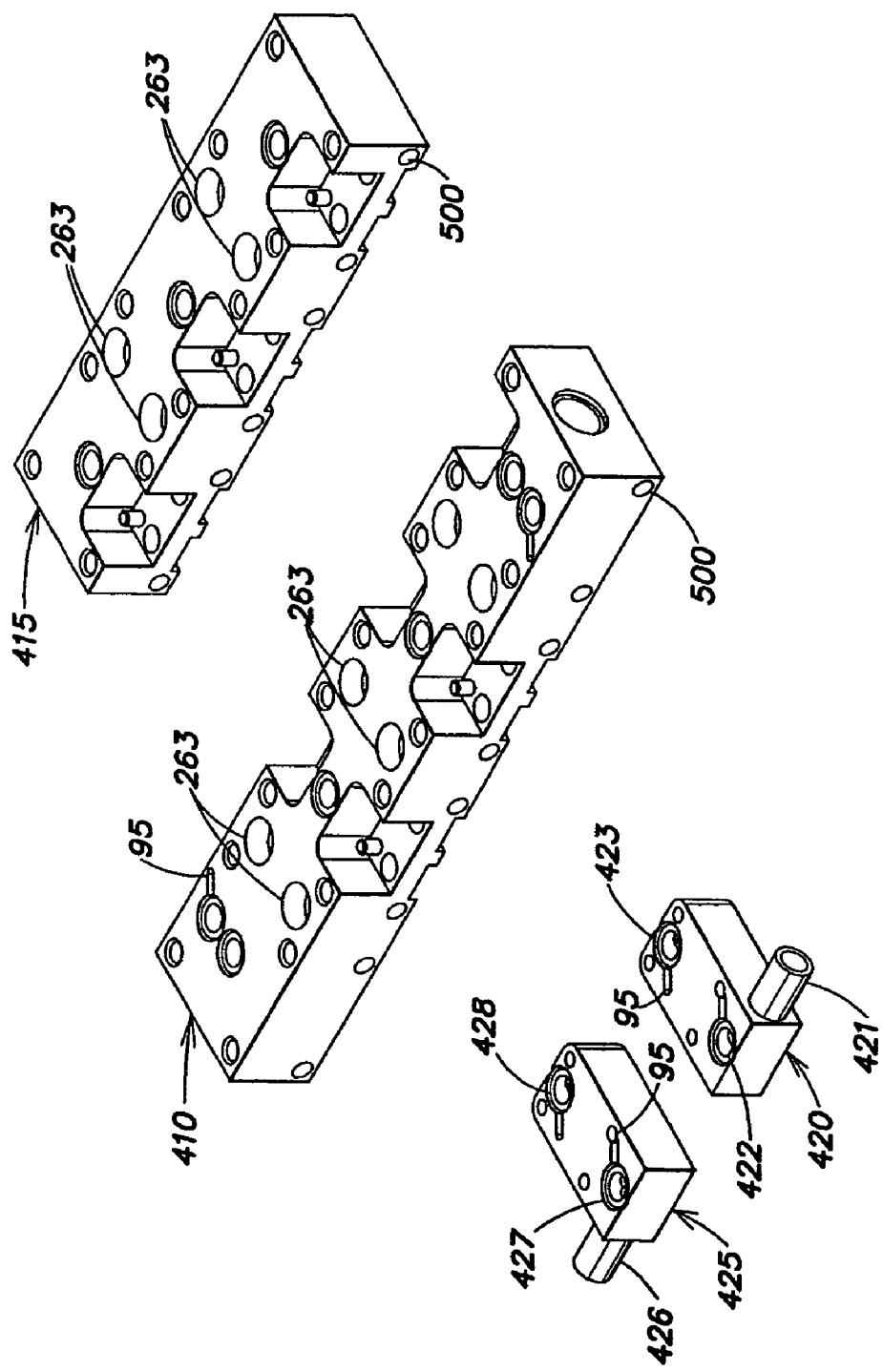
FIG. 24 is an expanded perspective view of a variety of multiple component substrates and substrate inserts that may be used to form the fluid the fluid distribution panel of FIG. 14.

Rather than using a one component position substrate 260 as in each of gas sticks A-E and H-L, gas stick F uses a one component position T-slotted substrate 430 that is adapted to receive either a left handed or right handed substrate insert 420, 425 (FIG. 24). The T-slotted substrate 430 includes an inlet port 431 and an outlet port 432 formed in a top surface thereof, and a channel 269, similar in construction to that of one component position substrate 260. However, the T-slotted substrate 430 also includes an additional channel 283 formed in the top surface of the substrate 430 that permits either a left handed or right handed substrate insert 420, 425 to be received therein.

Each of the left handed and right handed substrate inserts 420, 425 includes a pair of ports (422, 423 and 427, 428) formed in a top surface thereof that are connected by a V-shaped channel. Each of the left handed and right handed substrate inserts 420, 425 (FIG. 24) also includes a port 421, 426 formed in a surface of the substrate insert that is transverse to the top surface. The ports 421, 426 are internally fluidly connected to the V-shaped channel, and thus to each of ports 422, 423 and 427, 428, and may be used to connect to a manifold portion (e.g., manifold portion 240 in FIG. 14) that is fluidly connected to common manifold 2120 or 2130. In the embodiment illustrated in FIG. 14, a two port valve (not shown) may be positioned above port 432 in substrate 430 and above the port 422, 427 of the substrate inserts 420, 425 to selectively provide one or more process gases or a purge gas from one or more of gas sticks A-F and G-L to the port 423, 428 of the substrate insert 420, 425, and from there, to the mixing inlet substrate 410. Typically, a three-port valve is positioned above ports 423 and 428 of the substrate inserts 420, 425 to provide process gases to either the mixing inlet substrate 410 or to the mixing outlet substrate 415 via inserts 435B and 435C.

Figure 21:
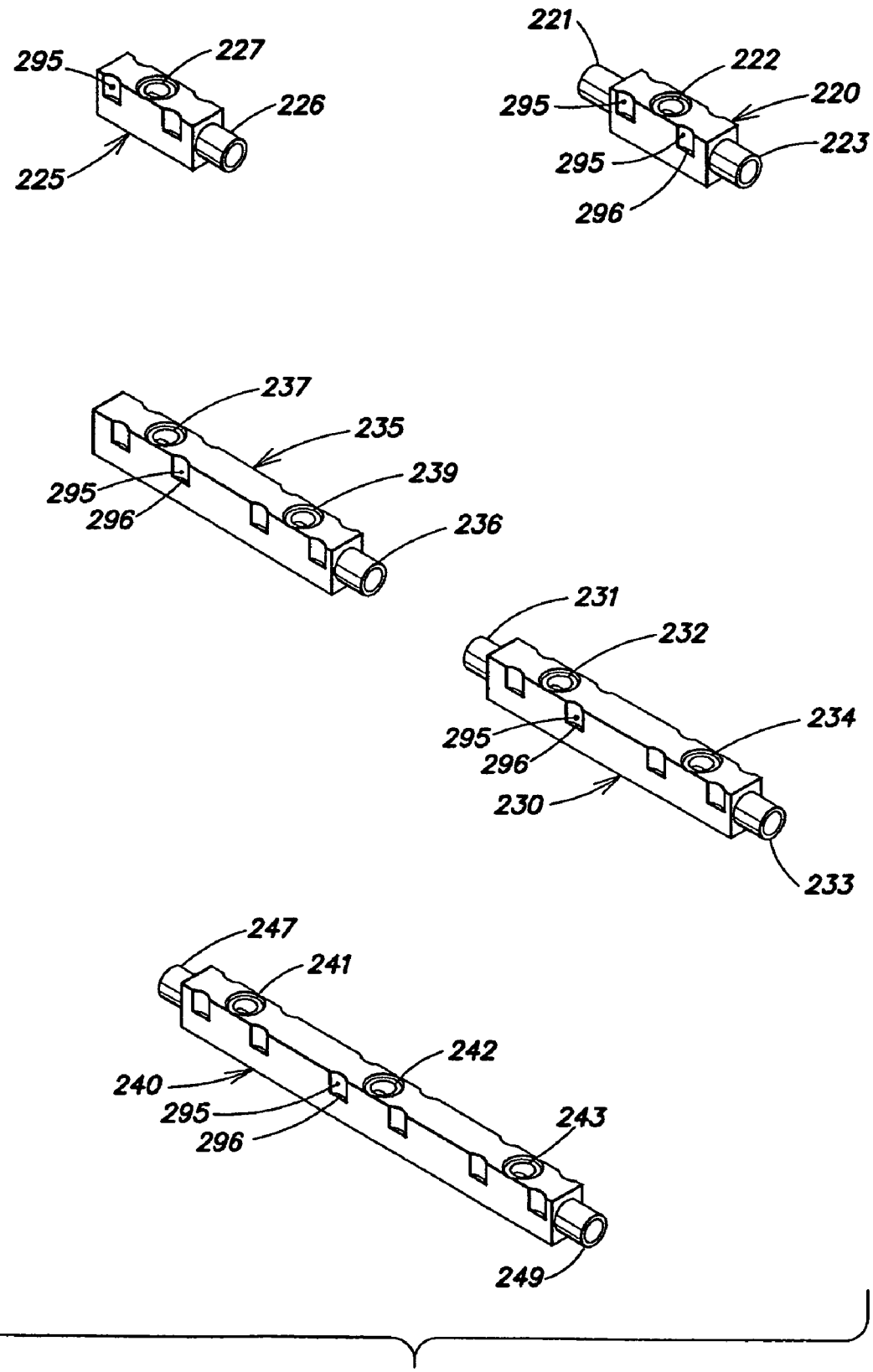
FIG. 21 is an expanded perspective view of a number of different manifolds that may be used to form the fluid distribution panel of FIG. 14.
Figure 22:
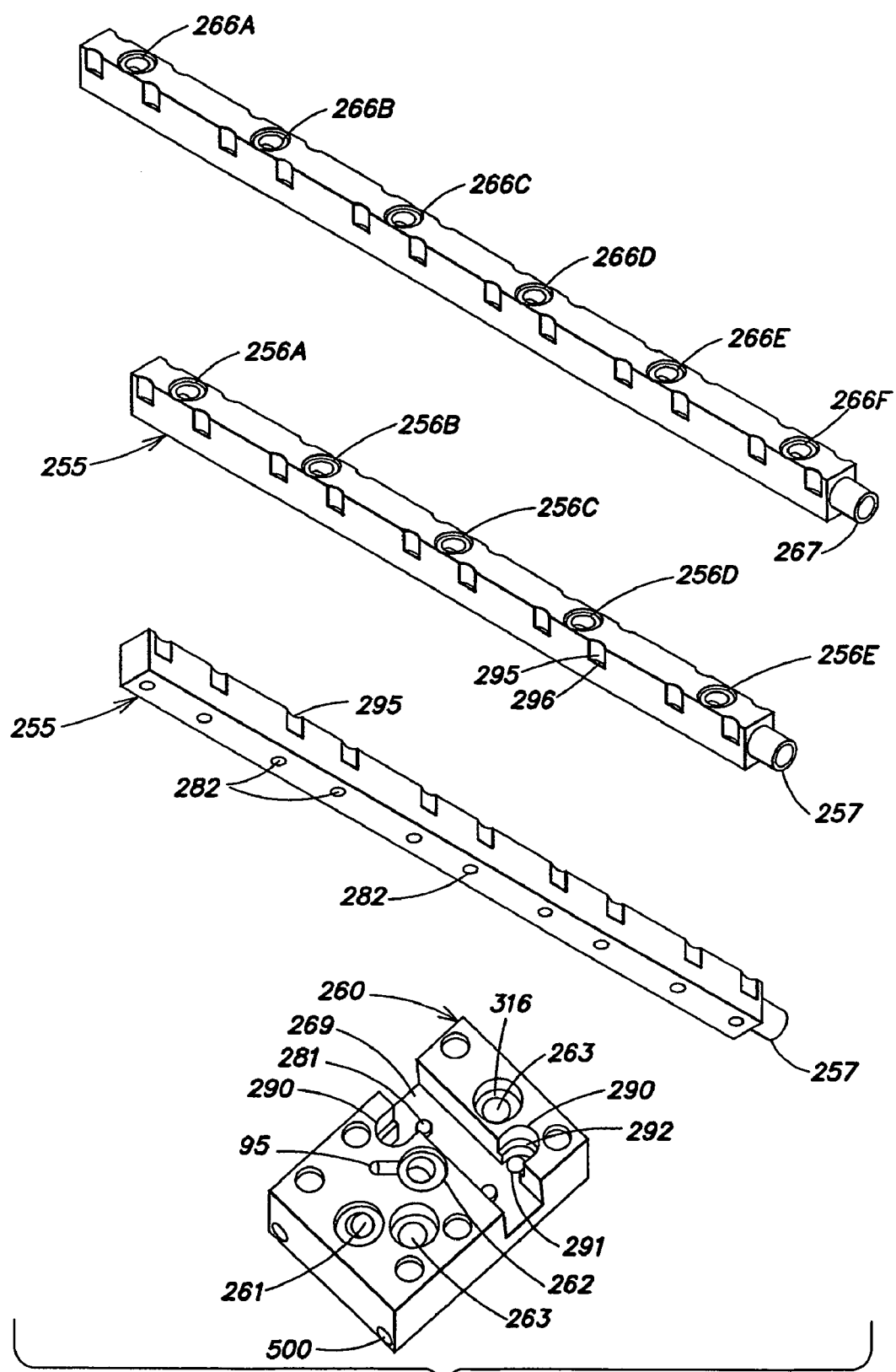
FIG. 22 is an expanded perspective view of a number of additional manifolds and a one component position substrate that may be used to form the fluid distribution panel of FIG. 14.
Figure 23:
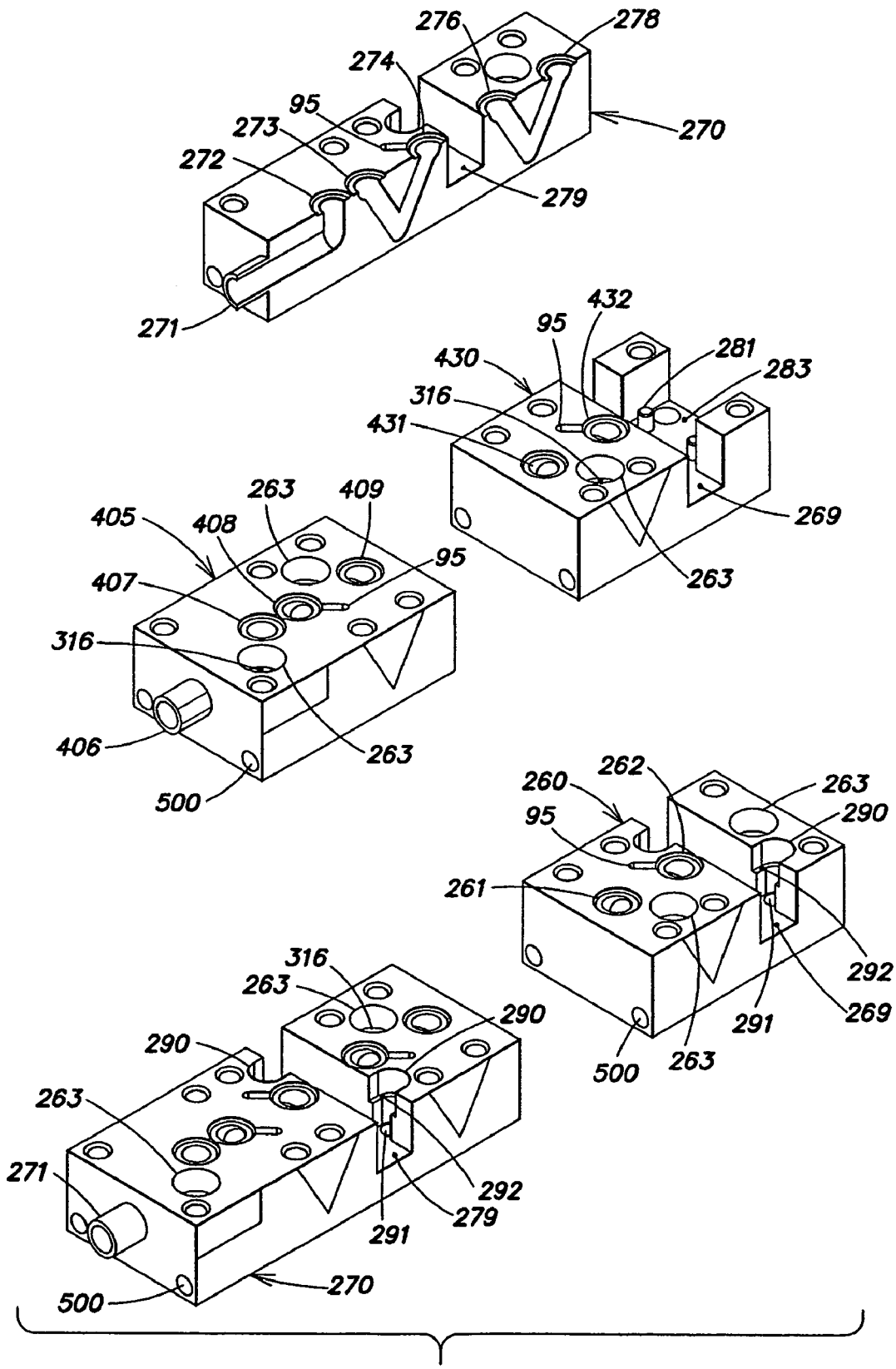
FIG. 23 is an expanded perspective view of a variety of substrates in accordance with one aspect of the present invention.

FIGS. 21 and 22 illustrate a number of manifold portions 220, 225, 230, 235, 240, 255, and 265 that may be used to form a gas panel according to an embodiment of the present invention. The manifold portions 220, 225, 230, 235, 240, 255, and 265 are similar to those described above with respect to FIG. 9, in that each includes a manifold body that is formed from an elongated block of stainless steel or other suitable material, and each includes at least one port formed in a top surface of the manifold body. Further, each of the manifold portions includes at least one port formed in a surface that is transverse to the top surface to connect with another manifold portion. As the manifold portions 220, 225, 230, 235, 240, 255, and 265 are substantially similar to those described above with respect to FIG. 9, only the differences are described in detail below.

As illustrated in FIGS. 21 and 22, each of the manifold portions 220, 225, 230, 235, 240, 255, and 265 includes at least one, and preferably, a pair of recesses 295 formed in a transverse side surface of the manifold portion and spaced apart from one another. Each of the recesses is outwardly arcuate in shape and forms less than one half a circle (i.e., spans less than 180 degrees). Preferably, for each port formed in the top surface of the manifold body, a pair of recesses 295 is formed on each side surface of the manifold body, with each recess of the pair being spaced equally from the port. Where the manifold body is symmetric (e.g., manifold portions 220, 240, etc.), it should be appreciated that fewer pairs of recesses may be provided, for example, one pair of recesses disposed on each opposing side surface of the manifold body. Each recess 295 terminates in an edge 296. As shown most clearly in FIGS. 18 and 20, each of the recesses is constructed to receive a fastener 205 that rigidly locks the manifold portion within the channel 269, 279 of a substrate 260, 270. The edge 296 of the recess 295 serves as a stop for the bottom edge of the head of the fastener 205 (similar in construction to fastener 315 shown in FIG. 26), and when the fastener 205 is inserted, the bottom edge of the head of the fastener 205 forces the manifold tight against the bottom of the channel 269, 279 of the substrate 260, 270. The top-most portion of the fastener 205 and the depth of the recess 295 are dimensioned so that the top-most portion of the fastener 205 does not protrude above the top surface of the substrate 260, 270 and interfere with the seal. In general, a pair of fasteners 205 located on opposite side surfaces of the manifold portion and on opposing sides of the port is sufficient to force the manifold portion tightly within the channel 269, 279 of the substrate 260, 270. As noted above, each of the substrates 260, 270 include a complementary mounting recess 290, such that when the manifold portion is aligned in the base of the channel 269, 279, the recesses 290 and 295 form a generally circular hole.

As should be appreciated by those skilled in the art, the use of fasteners 205 thus described serves to prevent the possibility of leakage among the ports of the substrate, the port of the manifold portion, and the fluid processing devices attached thereto from above. Specifically, by forcing the manifold portion solidly against the bottom of the channel 269, 279 in the substrate 260, 270, the manifold portion serves to define the alignment with the individual substrates 260, 270. Were the manifold portion not firmly secured in the channel 269, 279 of the substrate 260, 270, then it would be possible for a severe shock or vibration to further compress the gasket (frequently a deformable metal seal that is typically placed between the fluid processing device and the ports of the substrate and manifold portion) via vertical movement of the manifold portion within the channel (the manifold portion potentially being of less thickness than the channel depth), which in turn, could become a leak once that shock or vibrational force was removed.

Another difference between the manifold portions 220, 225, 230, 235, 240, 255, and 265 and those described above with respect to FIG. 9 is the presence of alignment holes 282 is the lower surface of the manifold portion. As can be seen most clearly in FIG. 22, each manifold portion may include one or more alignment holes 282 that are constructed to mate with complementary alignment pins 281 formed in a base of the channel 269, 279 of a substrate 260, 270. The alignment pins 281 may be made from dowel pins that can be press-fit into appropriate apertures that are drilled into the base of the channel 269, 279. By the use of the dowel pins in a press-fit arrangement, machining cost can be substantially reduced and the dowel pins can be purchased with accurate dimensions.

Preferably, each manifold portion includes two alignment holes 282 centrally disposed in the bottom surface of the manifold portion on either side of each port formed in the top surface of the manifold portion. In the illustrated embodiments, these alignment holes 282 are generally aligned with the recesses 295 in the side surfaces of the manifold portion. It should be appreciated that rather than having alignment holes 282 formed in the bottom surface of the manifold portions, alignment pins 281 could be provided instead, with the alignment holes 282 being provided in the base of the channel 269, 279 of the substrate 260, 270. It should also be appreciated that irrespective of where the alignment pins 281 and alignment holes 282 are formed, the alignment pins 281 should be shorter in length than the alignment holes, so that the bottom surface of the manifold portion is in registration with the base of the channel.

Although a number of different manifold portions 220, 225, 230, 235, 240, 255, and 265 have been described herein, it should be appreciated that the present invention is not limited to the illustrated embodiments. For example, manifold portions having a different number of ports formed on a top surface of the manifold body may be used, with only a single port in a transverse surface of the manifold body, or with two ports formed in opposing transverse surfaces of the manifold body. It should further be appreciated that although the ports formed in the top surface of the manifold portions are illustrated as including a counter-bore that is adapted to receive an annular C-type seal, different port configurations may alternatively be used, such that standard fluid processing components may be used therewith. Moreover, it is not required that all ports formed in the top surface of the manifold have the same type of seal configuration, as one type of seal may be used in one port, while another type of seal may be used in another port.

As shown in FIGS. 23 and 24, at least one of the ports in the top surface of the substrates 260, 270, 405, 410, 420, 425, 430 may include a leak port 95 that is formed in the top surface of the substrate. Typically, a leak port 95 is provided between each pair of ports to which a fluid component is to be fluidly connected. Moreover, although each of the substrates 260, 270 is depicted as having a single channel 269, 279 formed therein, multiple channels may alternatively be provided, such that various fluids may be introduced to each of the gas sticks A-L, or alternatively to one or more of the gas sticks. Moreover, it should be appreciated that although a specific configuration using a two port valve, a three port valve, and a mass flow controller in each of the gas sticks A-L has been described, the present invention is not so limited. Thus, in accordance with the teachings of the present invention, more than two component stations may be provided on a single substrate. For example, the substrates 260, 270 may include one or more additional component stations adapted to receive a filter, a pressure transducer or a pressure regulator, or a variety of other fluid processing components that are conventionally provided. Moreover, it is not required that the fluid components mounted to each of the substrates be the same in each gas stick, as a myriad of different combinations of components may be readily envisioned.

According to another aspect of the present invention, rather than mounting substrates directly to a base, the embodiment of FIGS. 14-28 utilizes a floating mount to resiliently mount substrates and other components to the mounting plate, which may then be attached to a base. The floating mount permits limited movement in three orthogonal directions, such that substrates, manifold portions, and other portions of the fluid distribution system may be easily interconnected without requiring extreme precision in the placement of holes in the mounting plate. The floating mount also thermally decouples components from the mounting plate and base, thereby permitting the components to be effectively heated or cooled with conventional techniques. Further, the floating mount also renders the fluid distribution system less sensitive to shock and vibration, yet provides significant pull and shear strength. This aspect of the present invention is now described primarily with respect to FIGS. 14, 18, 20, 23, 24, 25, 26, 27, and 28.

As shown in FIGS. 23 and 24, each of the various substrates 260, 270, 405, 410, 415, and 430 may include a plurality of mounting apertures or holes 263 that may be used to resiliently mount the substrate to the mounting plate 210. Each of these mounting apertures 263 receives a threaded fastener 315, such as an Allen bolt. Each of the mounting apertures 263 has a recessed edge 316 constructed to receive the bottom or lower edge of the head of the fastener 315 and urge the substrate toward the mounting plate 210 (FIG. 26) as the fastener is engaged in the floating mount 300. The depth of the edge 316 is such that when the fastener 315 is engaged with the floating mount 300, the top-most portion of the fastener is below the top surface of the substrate, as shown in FIG. 26. The edges of the mounting plate are bent such that region of the mounting plate in which the fluid distribution components are mounted is elevated from the base to which the plate is attached, as shown in FIG. 25.

Figure 27:
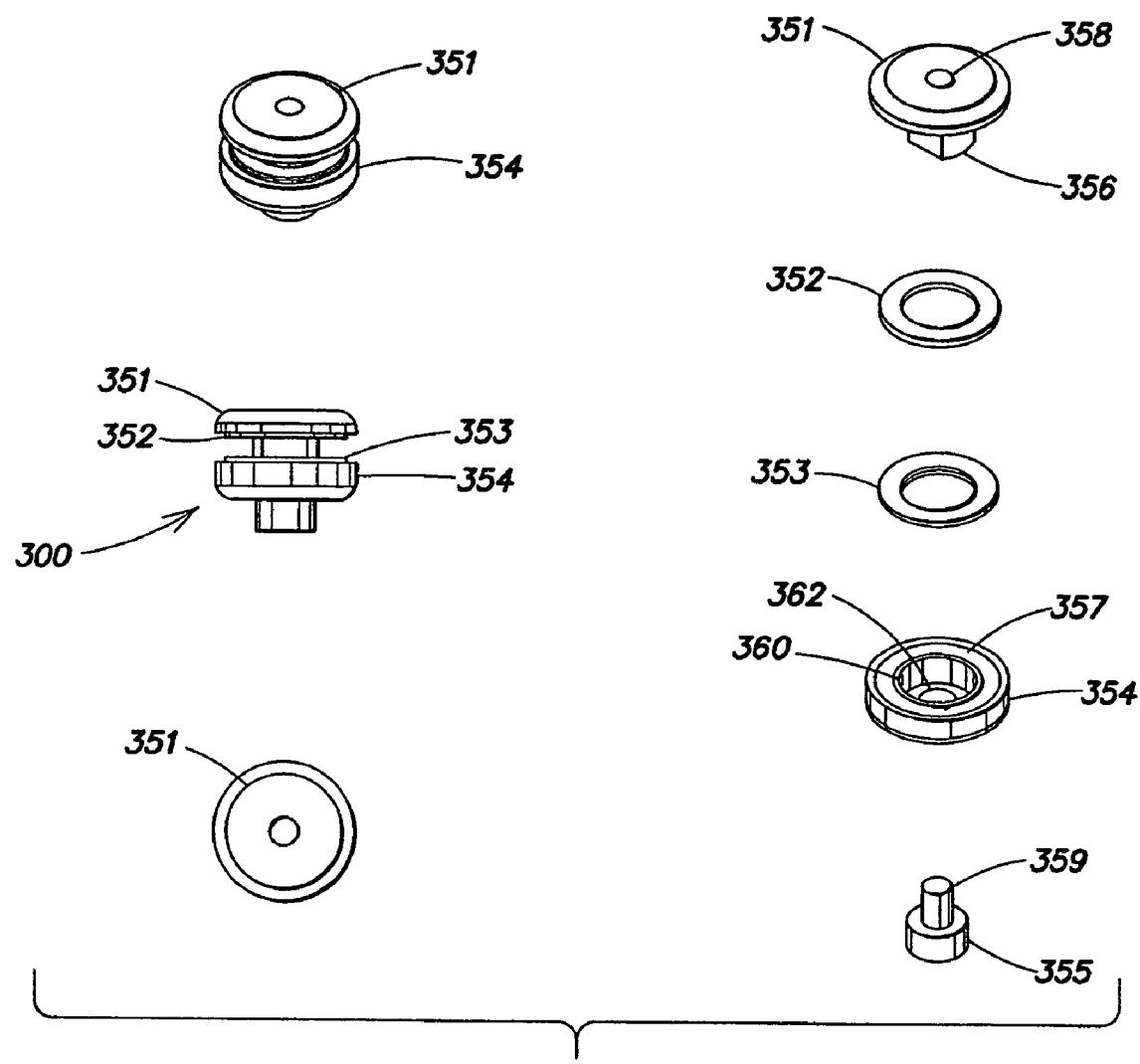
FIG. 27 is a view of the floating mount assembly of FIG. 26 from a variety of different perspectives.

The threaded fastener 315 is received in a floating mount 300, which is best illustrated in FIGS. 26 and 27. As shown, the floating mount 300 includes an upper pressure ring 351, a lower pressure ring 354, upper and lower resilient members 352, 353, and a threaded fastener 355. The upper pressure ring 351 is generally circular in shape and has a generally cylindrical shank 356 with flats on opposing sides of the shank. The flats on either side of the shank 356 engage the walls of the mounting plate 210 in which a complementary hole 299 (FIG. 28) is formed. An internally threaded through hole 358 that extends through the center of the upper pressure ring 351 and the shank 356 receives the threaded portion of the fastener 315. The upper pressure ring 351 also includes an annular groove 361 formed in an underside thereof that receives a toroidal upper resilient member 352. The toroidal upper resilient member 352 is generally formed from an elastomeric material, such as rubber, Viton, Neoprene, or Buna-N, for example, and may be a conventional o-ring.

The lower pressure ring 354 is also generally circular in shape and includes an annular groove 357 in a top surface thereof that receives a toroidal lower resilient member 353. The lower pressure ring 354 also includes a through hole 362 through which the externally threaded end of the threaded fastener 355 may pass, and includes an axial clearance hole 360 which permits the shank 356 of the upper pressure ring 351 to be received within the lower pressure ring 354. The upper and lower pressure rings 351, 354 may be machined from bar stock, or alternatively, powdered metal methods of forming the pressure rings may be used.

In use, the upper resilient member 352 is oriented in the annular groove 361 of the upper pressure ring 351 between the upper pressure ring 351 and the mounting plate 210 and the lower resilient member 353 is oriented in the annular groove 357 of the lower pressure ring 354 between the lower pressure ring and the mounting plate 210. The externally threaded fastener 355 is received in the internally threaded shank 356 of the upper pressure ring 351 and tightened to draw the upper and lower pressure rings together. Because the flats on opposing sides of the shank 356 engage the flat sidewalls of the hole 299 in the mounting plate 210, rotation of the floating mount 300 is prevented during tightening of the threaded fastener 355. A substrate or other component is placed above the upper pressure ring 351, and the threaded fastener 315 is tightened from above. Again, the flats in the shank 356 prevent rotation of the floating mount during tightening of the threaded fastener 315. The shank 356 of the upper pressure ring 351 and the threaded fasteners 315, 355 are dimensioned so that when fully tightened, the ends of the threaded fasteners 315 and 355 do not contact one another.

As may be appreciated by those skilled in the art, the floating mount 300 provides a number of advantages over mounting techniques that mount fluid components and other structures directly to a base. For example, the upper and lower resilient members 352, 353 operate to absorb shock and vibration, and permit a slight degree of movement in each of three orthogonal directions (i.e., left, right, and vertically in the plane of FIG. 14). Thus, the mounting holes 299 in the mounting plate may be formed with less accuracy than would be required if the components and other structures were mounted directly to the mounting plate. Nonetheless, because component substrates are attached to the floating mount 300 using threaded fasteners, and the floating mount is formed with threaded connections, the mounting possesses substantial pull and shear strength.

The upper and lower resilient members 352, 353 also function to thermally isolate the components from the mounting plate 210. Thus, each of the component substrates 260, 270, 405, 410, 415, and 430 may include holes 500 (see FIGS. 23 and 24) to receive either a heating element or a cooling element as desired for the particular application. Because the component substrates are thermally isolated from the mounting panel and the base, heating or cooling applied to the substrates is not readily conducted to the plate and the base, which acts as a large heat sink.

Figure 20:
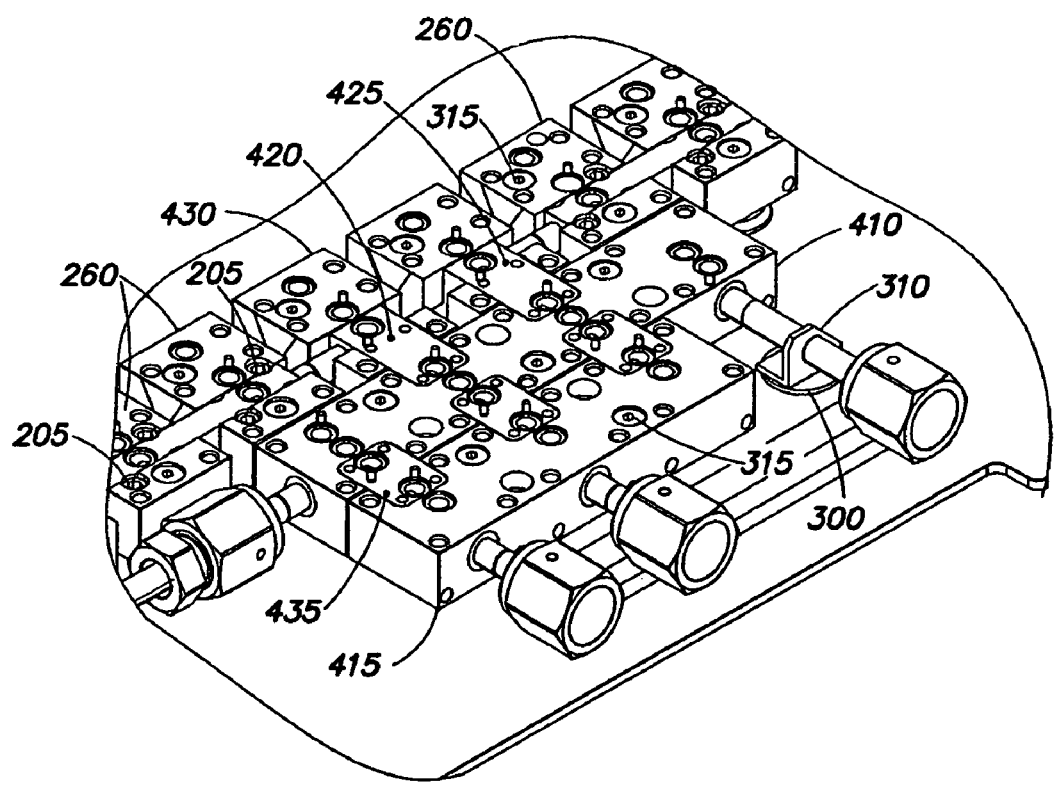
FIG. 20 is an expanded perspective view of a portion of the fluid distribution panel identified in FIG. 19.
Figures 19, 20:
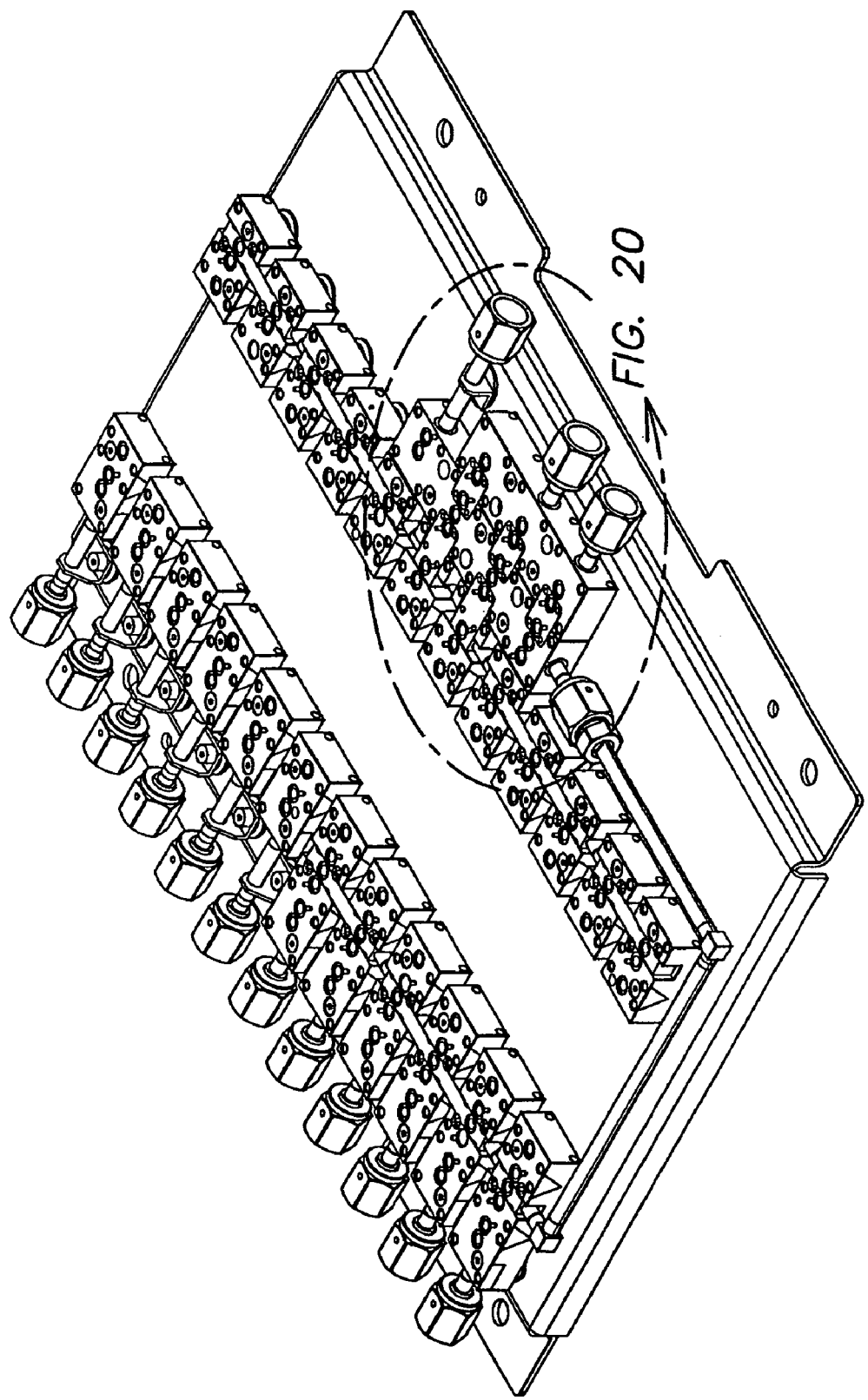
FIG. 19 is a perspective view of the fluid distribution panel of FIG. 14 rotated counter clockwise by approximately 45°.

Although the floating mount has been described as being used with component substrates 260, 270, 405, 410, 415, and 430, it may also be used with other structures that are attached to the mounting plate. For example, FIGS. 14 and 20 illustrate a support 310 that is used to support a conduit providing a process gas and resiliently mount the conduit to the mounting plate 210. A threaded fastener 305 (FIG. 26) may be inserted into the floating mount 300 through a hole in the base of the support 310. In general, any component or structure that might be attached to a base of a fluid distribution system using a threaded fastener may be used with the floating mount 300 where axial compliance, vibration damping, or thermal isolation are desired.

Having thus described several aspects of at least one embodiment of this invention, it is to be appreciated various alterations, modifications, and improvements will readily occur to those skilled in the art. For example, although the input ports 71, 271, and 406 in substrates 70, 270, and 405 are illustrated as being disposed in a front transverse surface of the substrate (see FIGS. 10, 11, and 23), they may alternatively be disposed in either the left or right side transverse surfaces to form a right-angled connection to a source of process fluid, rather than a straight connection. Such alterations, modifications, and improvements are intended to be part of this disclosure, and are intended to be within the spirit and scope of the invention. Accordingly, the foregoing description and drawings are by way of example only.

What is claimed is:

1. A gas panel, comprising:
    a first gas stick having a first flow path and including a first plurality of substrates, wherein each of the first plurality of substrates includes a substrate body, a fluid passageway formed in the substrate body, and a first plurality of ports formed in a first surface of the substrate body, the first plurality of ports located in a common plane;
    a second gas stick having a second flow path and including a second plurality of substrates, wherein each of the second plurality of substrates includes a substrate body, a fluid passageway formed in the substrate body, and a second plurality of ports formed in a first surface of the substrate body, the second plurality of ports located in the common plane;
    a first manifold having first and second ports, the first flow path including the first port of the first manifold and the second flow path including the second port of the first manifold, the first and second ports of the first manifold being fluidly connected to one another; and
    a second manifold having first and second ports, wherein the first flow path includes the first port of the second manifold, and wherein the second flow path includes the second port of the second manifold,
    wherein a first substrate of the plurality of substrates included in the first gas stick and a first substrate of the plurality of substrates included in the second gas stick each include a first channel adapted to receive a portion of the first manifold and to locate the first and second ports of the first manifold, respectively, in the common plane when the first manifold is received within the respective channel,
    wherein a second substrate of the plurality of substrates included in the first gas stick and a second substrate of the plurality of substrates included in the second gas stick each includes a second channel adapted to receive a portion of the second manifold and to locate the first and second ports of the second manifold, respectively, in the common plane when the second manifold is received within the respective second channels,
    wherein the gas panel includes a mounting plate to which the first and second gas sticks are mounted, and wherein the first and second gas sticks are mounted to the mounting plate with a mounting assembly that thermally decouples the first and second gas sticks from the mounting plate and one another, and
    wherein the first gas stick and the second gas stick are resiliently mounted to the mounting plate using a plurality of floating mounts.

2. The gas panel of claim 1, wherein the second manifold is adapted to receive a purge gas that can be selectively provided to either the first flow path or the second flow path.

3. The gas panel of claim 1, wherein the first channel in each of the first substrates included in the first gas stick and the second gas stick is perpendicular to the first and second flow paths.

4. The gas panel of claim 1, wherein the gas panel includes a mounting plate to which the plurality of substrates included in the first gas stick and the plurality of substrates included in the second gas stick are resiliently mounted to permit limited movement in a plurality of orthogonal directions.

5. The gas panel of claim 1, wherein each first substrate in the first and second gas sticks includes a plurality of mounting apertures formed in the first surface of the substrate body, the plurality of mounting apertures including at least one first mounting aperture disposed on a first side of the first channel and at least one second mounting aperture disposed on a second side of the first channel, the plurality of apertures in the substrate body of the first substrate of the first gas stick being arranged to mount a first fluid component in sealing engagement with the first port of the first manifold and one port of the first plurality of ports, and the plurality of apertures in the substrate body of the first substrate of the second gas stick being arranged to mount a second fluid component in sealing engagement with the second port of the first manifold and one port of the second plurality of ports.

6. The gas panel of claim 1, wherein each respective first substrate in each of the first and second gas sticks includes a plurality of mounting apertures to secure a respective fluid component to the respective first substrate.

7. The gas panel of claim 1, wherein at least one of the first channel in the first substrate of the first gas stick and the portion of the manifold received therein includes means for aligning the first port of the first manifold with one of the first plurality of ports.

8. The gas panel of claim 1, wherein the first manifold has a third port, the gas panel further comprising:
    a third gas stick having a third flow path including a third plurality of substrates, wherein each of the third plurality of substrates in the third gas stick includes a substrate body, a fluid passageway formed in the substrate body, and a third plurality of ports formed in a first surface of the substrate body, the third plurality of ports located in the common plane;

wherein the third port of the first manifold is connected to a first port of the third plurality of ports of the third gas stick via a first fluid component.

9. The gas panel of claim 8, wherein the second manifold has a third port, and wherein the third port of the second manifold is fluidly connected, via a second fluid component, to two ports of the third plurality of ports included in the third gas stick that are distinct from the first port of the third gas stick.

10. The gas panel of claim 9, wherein the second manifold is adapted to receive a purge gas that can be selectively provided to at least one of the first flow path, the second flow path, and the third flow path.

11. The gas panel of claim 1, wherein the first and second flow paths are perpendicular to a first axis that extends from the first port of the first manifold to the second ports of the first manifold.

12. The gas panel of claim 11, wherein the first and second flow paths are perpendicular to a second axis that extends from the first port of the second manifold to the second port of the second manifold.

13. The gas panel of claim 1, wherein the gas panel includes a mounting plate to which the first and second gas sticks are mounted, and wherein the first and second gas sticks are resiliently mounted to the mounting plate to permit limited movement in a plurality of orthogonal directions.

14. The gas panel of claim 1, wherein the at least one of the plurality of substrates included in the first gas stick includes a surface that is transverse to the first surface, and wherein the surface that is transverse includes a gas inlet.

15. A gas panel, comprising:
a first gas stick having a first flow path including a first plurality of ports formed in a common plane;
a second gas stick having a second flow path including a second plurality of ports formed in the common plane; and
a first manifold having first and second ports formed in the common plane, the first port being fluidly connected to one port of the first plurality of ports of the first gas stick, and the second port being fluidly connected to one port of the second plurality of ports of the second gas stick,
wherein the first and second gas sticks each includes a first substrate having a channel in which the first manifold is received, the channel being adapted to position the first and second ports of the first manifold in the common plane with the one port of the first and second gas sticks, respectively, and
wherein the channel in the first substrate of the first gas stick includes a pair of sidewalls and a base, wherein at least one sidewall of the pair of sidewalls includes at least one first recess extending into the base and having a first edge, and wherein the first manifold includes at least one second recess terminating in a second edge that is complementary to the at least one first recess, the gas panel further comprising:
at least one fastener to engage the first and second edges.

16. A gas panel, comprising:
a first gas stick having a first flow path including a first plurality of ports formed in a common plane;
a second gas stick having a second flow path including a second plurality of ports formed in the common plane;
a first manifold having first and second ports formed in the common plane, the first port being fluidly connected to one port of the first plurality of ports of the first gas stick, and the second port being fluidly connected to one port of the second plurality of ports of the second gas stick; and
a second manifold having first and second ports formed in the common plane, the first port of the second manifold being fluidly connected to two ports of the first plurality of ports of the first gas stick that are distinct from the one port of the first gas stick, and the second port of the second manifold being fluidly connected to two ports of the second plurality of ports of the second gas stick that are distinct from the one port of the second gas stick,
wherein the gas panel includes a mounting plate to which the first and second gas sticks are mounted, and wherein the first and second gas sticks are resiliently mounted to the mounting panel to permit limited movement in a plurality of orthogonal directions, and
wherein the first and second gas sticks are resiliently mounted to the mounting panel using a plurality of floating mounts, and wherein the plurality of floating mounts thermally decouple the first and second gas sticks from the mounting panel and one another.

* * * * *